(12) United States Patent
Sahu et al.

(10) Patent No.: US 12,197,443 B2
(45) Date of Patent: Jan. 14, 2025

(54) USING STATEMENT CACHING WHEN IMPLEMENTING SERVER BASED OR PROXY BASED POOLING SOLUTIONS

(71) Applicant: Oracle International Corporation, Redwood Shores, CA (US)

(72) Inventors: Sumit Sahu, Bangalore (IN); Srinath Krishnaswamy, Fremont, CA (US); Krishna Mohan Itikarlapalli, Bangalore (IN); Rajesh Kumar, Noida (IN); Anoop J S, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/128,914

(22) Filed: Mar. 30, 2023

(65) Prior Publication Data
US 2024/0330297 A1 Oct. 3, 2024

(51) Int. Cl.
*G06F 16/00* (2019.01)
*G06F 16/2455* (2019.01)

(52) U.S. Cl.
CPC .. *G06F 16/24552* (2019.01); *G06F 16/24553* (2019.01)

(58) Field of Classification Search
CPC ................................................ G06F 16/24552
See application file for complete search history.

(56) References Cited

U.S. PATENT DOCUMENTS

| | | | | |
|---|---|---|---|---|
| 10,776,378 B2* | 9/2020 | Shivarudraiah | ....... | G06F 16/252 |
| 11,914,590 B1* | 2/2024 | Plenderleith | ...... | G06F 16/24542 |
| 2004/0210884 A1* | 10/2004 | Raghavachari | ..... | G06F 9/44505 717/130 |
| 2007/0136311 A1* | 6/2007 | Kasten | .................... | H04L 67/14 |
| 2012/0158770 A1* | 6/2012 | Benadjaoud | .......... | G06F 16/951 707/769 |
| 2016/0092524 A1* | 3/2016 | Shivarudraiah | ....... | G06F 16/245 707/602 |
| 2016/0092542 A1* | 3/2016 | Shivarudraiah | ... | G06F 16/24554 707/600 |
| 2019/0325052 A1* | 10/2019 | Bastawala | ......... | G06F 16/24539 |
| 2019/0342398 A1* | 11/2019 | Kasten | ................ | H04L 67/1021 |

(Continued)

FOREIGN PATENT DOCUMENTS

CN 111581234 A * 8/2020 ......... G06F 16/2433

OTHER PUBLICATIONS

Brandsberg, E., et al., "Advanced Connection Pooling with the Heimdall Proxy," AWS Partner Network (APN) Blog, dated Oct. 20, 2020.

(Continued)

*Primary Examiner* — Alexander Khong
(74) *Attorney, Agent, or Firm* — Vista IP Law Group, LLP

(57) ABSTRACT

Disclosed is an improved approach to implement cursor sharing in database systems, where a server-side mapping of cursor identifiers to SQL is maintained to allow for continued use of client-side statement caches even after connections and database sessions are returned to shared pools and then subsequently re-assigned. This avoids the need to clear the statement cache across session releases to the database session pools. Instead, applications can retain their statement cache while still leveraging the benefits of server based pooling solutions.

21 Claims, 26 Drawing Sheets

(56) References Cited

U.S. PATENT DOCUMENTS

2021/0382859 A1* 12/2021 Silberkasten ......... G06F 16/972
2022/0197900 A1*  6/2022 Maheshwari ..... G06F 16/90324

OTHER PUBLICATIONS

Mensah, K., "Revisiting the Performance & Scalability of Java Applications that use RDBMSes," Medium, dated Sep. 3, 2018.
"6 Statement Caching," Oracle® Database JDBC Developer's Guide and Reference 10g Release 1 (10.1), URL: https://docs.oracle.com/cd/B13789_01/java.101/b10979/stmtcach.htm, date found via Google as Nov. 9, 2014.
"Statement and Result Set Caching," JDBC Developer's Guide and Reference, URL: https://docs.oracle.com/en/database/oracle/oracle-database/21/jjdbc/statement-and-resultset-caching.html#GUID-F3F4BB63-356A-4F65-81B1-5C84FC35A16D, date found via Internet Archive as May 12, 2021.
"OCI and Statement Caching," Oracle Forums, URL: https://forums.oracle.com/ords/apexds/post/oci-and-statement-caching-7082, dated Jun. 20, 2011.
"JDBC Statement Caching: Implicit vs. Explicit," aregger blog, URL: https://blog.aregger.io/2019/08/05/jdbc-statement-caching/, dated Aug. 5, 2019.
"Tuning Data Source Connection Pools," Oracle, URL: https://docs.oracle.com/cd/E23943_01/web.1111/e13737/ds_tuning.htm#JDBCA490, date found via Internet Archive as Jan. 16, 2017.
"Working with Engines and Connections," SQLAlchemy, URL: https://docs.sqlalchemy.org/en/13/core/connections.html, dated Mar. 30, 2021.
"Why Prepared Statements are important and how to use them "properly"," TechTarget, URL: https://www.theserverside.com/news/1365244/Why-Prepared-Statements-are-important-and-how-to-use-them-properly, dated Jan. 1, 2000.
Tsalouchidis, A., "ProxySQL Query Cache: What It Is, How It Works," PERCONA, dated Feb. 7, 2018.
"Oracle® Call Interface, Programmer's Guide," 11g Release 2 (11.2), dated Aug. 2009.

* cited by examiner

USING STATEMENT CACHING WHEN IMPLEMENTING SERVER BASED OR PROXY BASED POOLING SOLUTIONS

BACKGROUND

Many operations performed in a database system are executed using database query language statements, such as statements in the structured query language (SQL). SQL is a non-procedural language for accessing and manipulating data in a relational or object-relational database. Procedural languages, such as PL/SQL, may also be used to perform operations in a database system. For purpose of illustration, this document will be explained with reference to SQL statements and relational database structures such as tables and rows. It is noted, however, that the inventive concepts disclosed herein are applicable to other types of languages, objects, structures, and operations in a database.

A cursor is a handle to a query execution area corresponding to an area in memory in which a parsed SQL statement and/or other information for processing the SQL statement are stored. Cursors allow a SQL statement to retrieve rows from a database table into a given result set, which can then be accessed, displayed, or operated upon. To execute a SQL statement, the cursor is first created, either in conjunction with the SQL query or independently. The cursor may be automatically handled by the database system, or manually controlled by a programmer through an application programming interface. The SQL statement is thereafter parsed, optimized, and executed to produce a set of rows called the result set. The rows in the result set are retrieved ("fetched") either a row at a time or in groups. The cursor can be considered the database query and its result set.

A significant level of overhead and expense is normally required to create a cursor, particularly due to the sheer amount of work involved to generate an execution plan for that statement. The SQL compilation process involves a parse phase, where the SQL statement is analyzed and parsed into its constituent components to create an expression/parse tree. An optimizer accepts the parsed and analyzed statement from the parse phase to determine an appropriate method to best execute the particular SQL statement based upon a number of criteria, including gathered statistical information, optimization methodologies, and/or selectivity analysis. The result is a memory resident data structure that dictates an execution plan for carrying out the database statement request.

Due to this expense, it is often inefficient to recreate a cursor each and every time a request is made to execute a particular SQL statement. Instead, the cursor can be cached and reused to execute the same SQL statement. Therefore, in the context of databases, caching (such as cursor caching) can be used to substantially improve the efficiency and throughput of database operations and applications.

With respect to cursors, a client-side "statement cache" may be used to avoid the need to perform repeated generation of cursors at a database server. The client-side statement cache includes cursor identifiers that act as a reference to a server-side cached cursor that was previously created for a given SQL statement. When the client seeks to execute a SQL statement that was previously executed and cached, the corresponding cursor identifier is identified from the statement cache and sent to the server to indicate that a cached cursor is to be used to process the SQL statement.

At the client-side, the cursor identifier for a SQL statement may be maintained relative to a specific connection used by the client to access the server. At the server-side, the same cursor number for the same SQL statement may be maintained relative to a specific database session at the server. If the same client connection is always associated with the same database session, then this arrangement will always result in the cursor identifier in the client-side statement cache matching the same cursor identifier maintained at the database session at the server.

However, the problem addressed by this disclosure arises in the situation where a connection may be assigned to a client that is independent of any specific database session. In this situation, it is possible that a first connection that was previously associated with a first database session is re-used by a client such that the first connection is subsequently associated with a second (different) database session, and a second connection that was previously associated with the second database session is subsequently associated with the first database session. When the first connection was associated with the first database session, there may have been a correct match between the cursor identifiers maintained at the client-side statement cache to the same cursor numbers maintained in the server-side cursor tables. However, when that first connection is subsequently associated with a second database session, then a mismatch may now exist between the cursor identifiers maintained at the client-side statement cache and the cursor numbers maintained in the server-side cursor tables. This means that the client-side may be expecting a first SQL statement to be executed based upon the cursor identifier, but the database session at the server side actually executes an entirely different SQL statement due to that same cursor identifier now matching to a different SQL statement at the new database session.

Therefore, there is a need for an improved approach to implement database processing that addresses some or all of the problems described above.

SUMMARY

Some embodiments are directed to an improved approach to implement cursor sharing in database systems, where a server-side mapping of cursor identifiers to SQL statements is maintained to allow for continued use of client-side statement caches even after connections and database sessions are returned to shared pools and then subsequently re-assigned. Embodiments of the invention avoid the need to clear the statement cache across session releases to the database session pools. Instead, applications can retain their statement cache while still leveraging the benefits of server based pooling solutions. This provides a performance improvement to end applications as well as reduced CPU usage on the database, since less time and resources need to be spent for parsing and analyzing of statements. This means that when using server side or proxy based pooling solutions like Database Resident Connection Pooling (DRCP) or Proxy Resident Connection Pooling (PRCP), the statement cache built on the client for frequently executed SQL statements does not need to be cleared across requests.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Statement caching is an important aspect of database applications as it avoids the need of repeated parsing of frequently executed statements on the server thus improving performance. However, a mismatch may occur between the contents of a client-side statement cache and a server-side cursor when connections are re-assigned to different sessions.

Figure 1A:
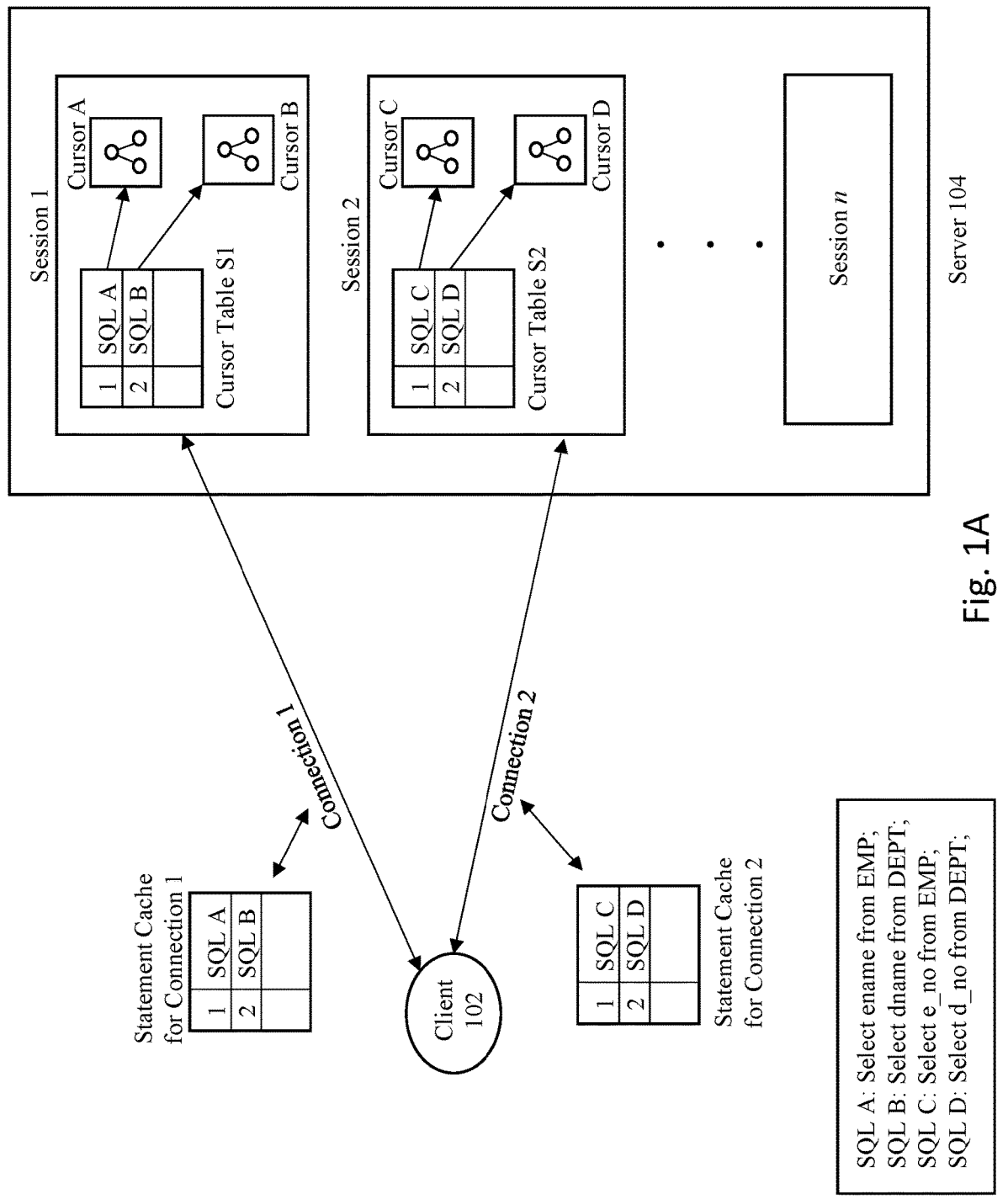
FIGS. 1A-E provide an illustration example of a type of problem that may occur when using server side or proxy based pooling solutions.

The diagrams in FIGS. 1A-E provide an illustrative example of this type of problem. The diagram in FIG. 1A shows statement caches and associated cursor objects on the server. In particular, a client 102 is shown in the figure that seeks to perform operations at a database server 104. The client 102 has established a connection 1 that is associated with a session 1 at the server 104. The client 102 may also have established another connection 2 that is associated with session 2 at the server 104. There are numerous reasons for a client to want to establish multiple connections to a server. One reason is that the client may be performing work on behalf of multiple processing entities, and each of the processing entities may cause the client to use a separate connection to operate with the server. For example, in a multi-threaded system, a first thread at client 102 may use connection 1 while a second thread uses connection 2.

The client may issue queries to be executed at the server. The process to execute a query may include at least two phases—compilation and execution. During compilation, one or more database server processes perform many functions, such as parsing the query, determining what table(s), column(s), data type(s), etc., are involved, determining whether an index may be used, and generating an execution plan. This process of compilation is typically referred to as a "hard parse" The execution plan and other information utilized during the compilation stage are saved in a structure referred to as a cursor. During execution, one or more database server processes use the cursor to execute the query.

Because so much work is involved in parsing and compilation, it would be beneficial for a new query to share the cursor that was generated for a previous query. Therefore, once a query is compiled, its cursor may be shared for subsequently issued queries that are (syntactically or at least semantically) equivalent. Such using for a new query of a cursor that was generated for a previous query is referred to as "cursor sharing."

Various structures are maintained at the server that may be used to implement cursor sharing. For each session, a cursor table is used to hold entries that correspond to the cached cursors. Each entry in the cursor table includes a cursor identifier and a reference to a cursor object. The cursor object includes the various structures that were created and maintained to execute the SQL associated with that cursor (e.g., a parse tree).

In the example of FIG. 1, session 1 maintains a cursor table S1. Cursor table S1 includes a first entry for SQL A, that includes a cursor identifier "1" and a reference for the cursor object (cursor A) for SQL A. The cursor table S1 for session 1 also includes a second entry for SQL B, that includes a cursor identifier "2" and a reference for the cursor object (cursor B) for SQL B.

Similarly, session 2 maintains a cursor table S2. Cursor table S2 includes a first entry for SQL C, that includes a cursor identifier "1" and a reference for the cursor object (cursor C) for SQL C. The cursor table S2 for session 2 also includes a second entry for SQL D, that includes a cursor identifier "2" and a reference for the cursor object (cursor D) for SQL D.

On the client-side, the client 102 will maintain a statement cache for each connection. The statement cache includes entries that include a cursor identifier and a copy of the SQL statement. In the current example, connection 1 is associated with a statement cache that includes a first entry having a cursor identifier of "1" and a copy of the statement for SQL A. The statement cache also includes a second entry having a cursor identifier of "2" and a copy of the statement for SQL B. Similarly, connection 2 is associated with a statement cache that includes an entry having a cursor identifier of "1" and a copy of the statement for SQL C. The statement cache for connection 2 also includes an entry having a cursor identifier of "2" and a copy of the statement for SQL D.

When a new query is issued to a database system that employs cursor sharing, a stored set of previously-generated cursors is searched to determine whether a previously-generated cursor can be used by the new query. Not only does cursor sharing avoid a hard parse each time an equivalent query is executed, but cursor sharing may also reduce the amount of shared memory required to store the cursors.

As pointed out above, in order to execute SQL statements, a session on the server will normally need to perform a parse of the SQL, followed by semantic and syntactic analysis. The outcome of the parse and analysis phase is used to form the cursor. A cursor is a complex structure and building it requires some heavy lifting on the part of the server. Once a cursor is built, a reference to it is allocated and kept in a server-side data structure referred to herein as the cursor table. In some embodiments, the reference to the cursor is just a number, and this cursor number is returned to the client which stores this cursor number in its statement cache. In some embodiments, the statement cache is a mapping of the SQL text to the cursor number. The mapping can be maintained through any data structure. For the purpose of this disclosure, one can implement the mapping by using a hash table with the hashing key being the SQL text and the hash entry being the cursor number which is returned by the server. The reason behind maintaining the statement cache is to avoid repeated rebuilding of the cursor objects on the server side when the client executes the same statements repeatedly. In the absence of the statement cache, every time the client needs to execute a SQL statement, it will need to send the whole SQL text every time and the server will have to perform the whole heavy lifting of parsing/semantic/syntactic. With the statement cache, when the client needs to execute the SQL statement, it simply sends the cursor number and the server can readily execute it instead of spending resources on parsing and analyzing the SQL.

In the current example, cursor sharing may occur by having the client search the statement cache for an entry that matches the query sought to be executed. For example, assume that the user currently using connection 1 seeks to execute SQL A. The system may hash the contents of SQL A to identify the specific entry in the statement cache of connection 1 that is associated with SQL A. Here, it can be seen that the first entry in the statement cache for connection 1 is associated with SQL A. The cursor identifier "1" for SQL A can thus be identified. At this point, the client would send the cursor identifier "1" through connection 1 to session 1. The value of the cursor identifier "1" would be used to search through and identify the corresponding entry in the cursor table S1 that has the same cursor identifier. That identified entry in the cursor table S1 would include a reference that points to the existing cursor object (Cursor A) for SQL A, which would then be used to execute the query and to return the results back to the client-without having to generate a new cursor since there is already a cached cursor that corresponds to the query being executed.

What this means is that the connections in the diagram denoted as connection 1 and connection 2 incur the cost of parsing of statements just once, for the first time that the statement is seen. After that, the client application only needs to send the cursor number to the server and the server can then bypass the parsing of the statements and syntactic and semantic analysis of the statements.

The problem, however, is that with client/server based connection/session pooling solutions, when the client releases the connections and/or server sessions, the statement cache can no longer be used because the notion of the cursor numbers may hold different meanings in different sessions.

Figure 1B:
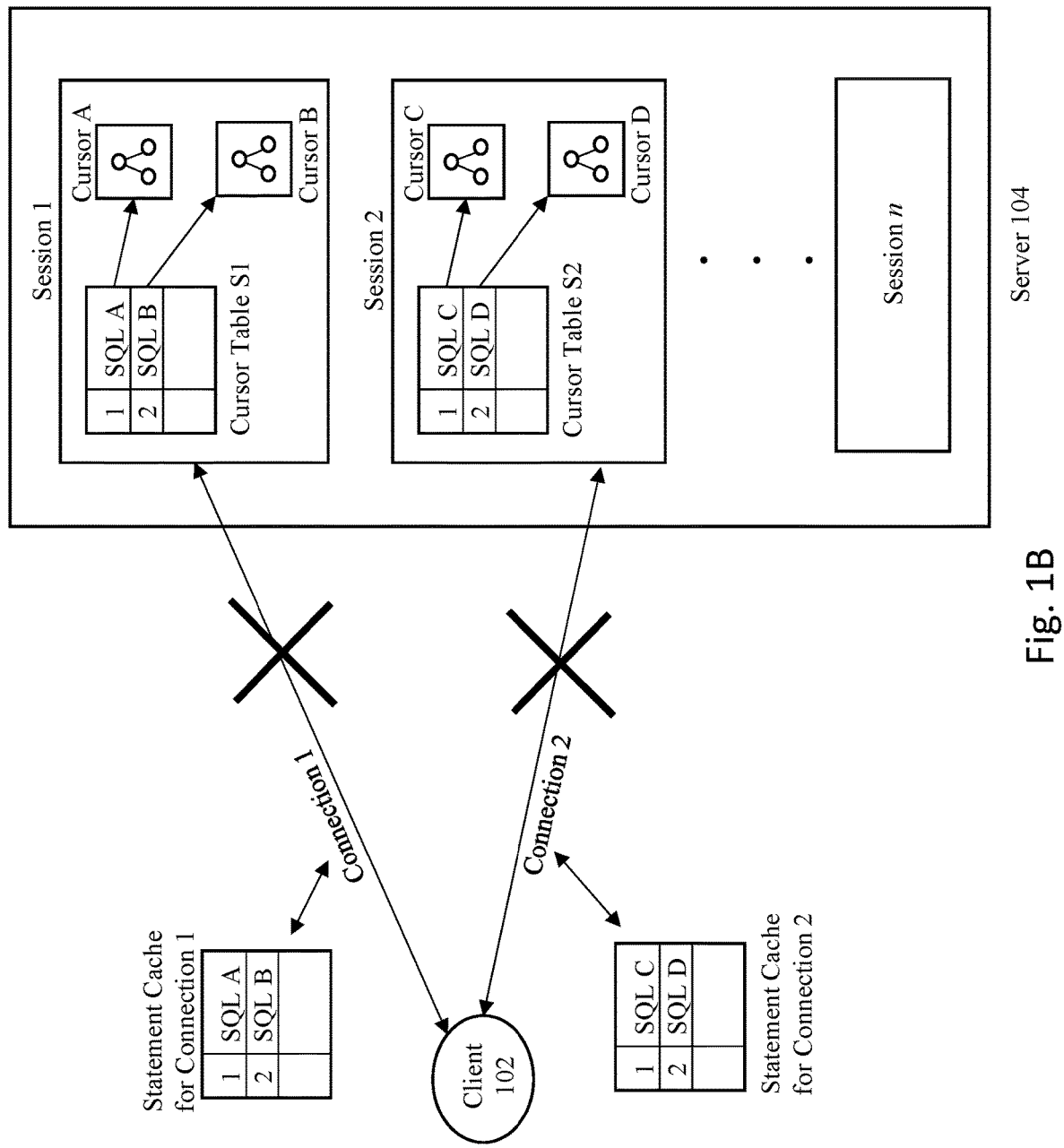
Figure 1C:
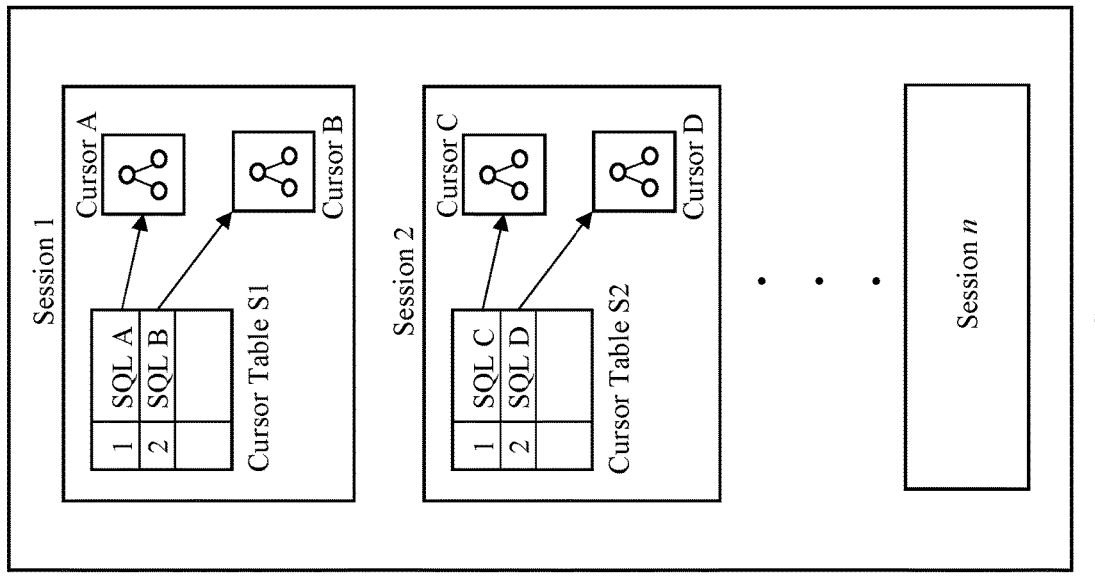
Figure 1C:
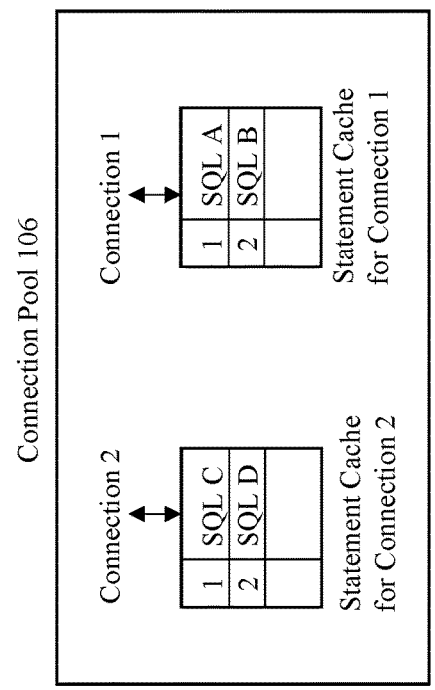

To explain, consider the situation shown in FIG. 1B where the client 102 has released both connections 1 and 2. As shown in FIG. 1C, this means that the connections are now in a connection pool 106 ready to be re-assigned again upon future needs of the client. Similarly, session 1 and session 2 have also been released (e.g., to a session pool) and await future re-assignment to a subsequent connection request.

Figure 1D:
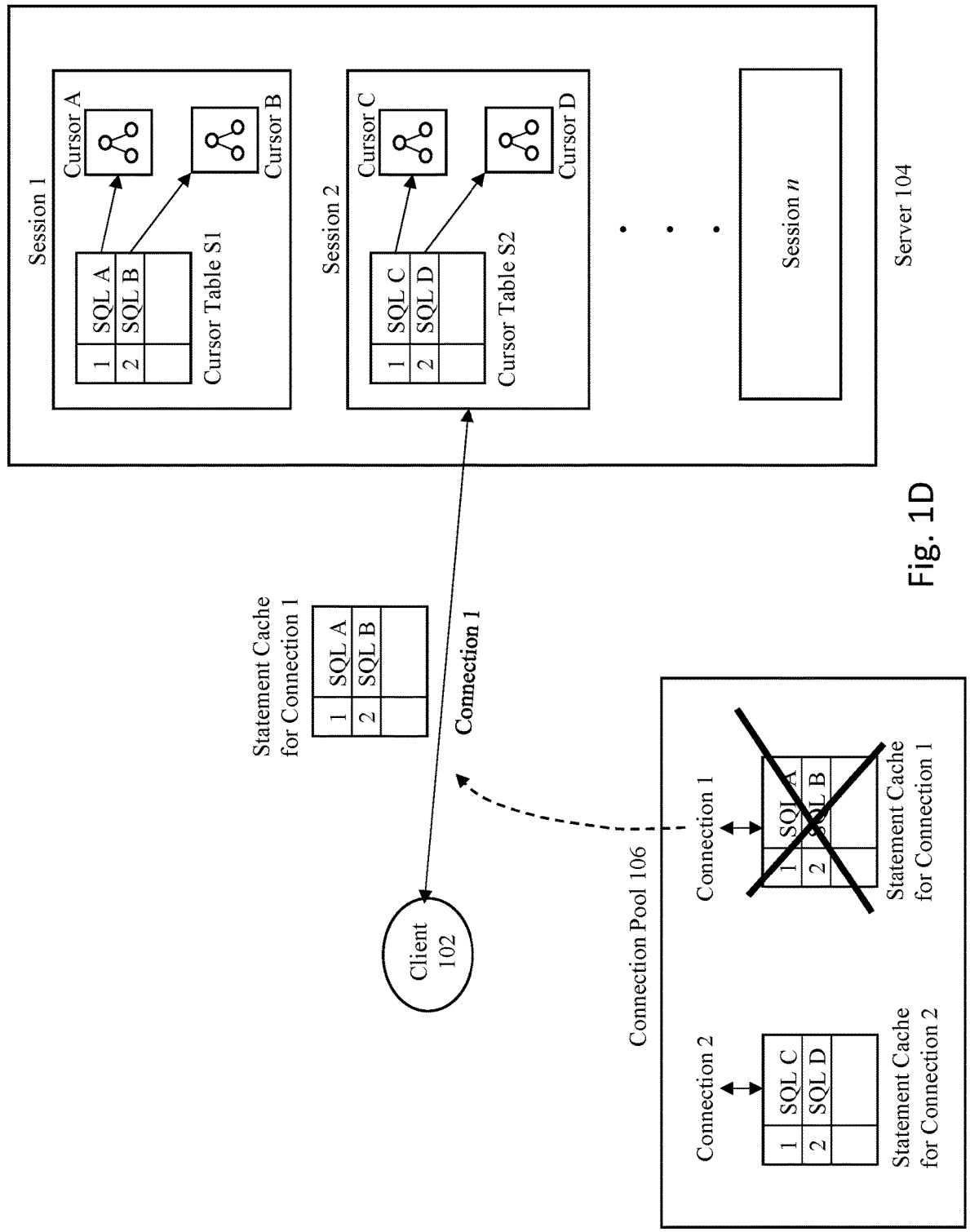

Assume that at a future time, client 102 seeks to establish another connection to the server 104. As illustrated in FIG. 1D, connection 1 may be assigned from the connection pool 106 to be used by the client 102 to establish the desired connection to the server 104. However, in the current circumstances, connection 1 is now associated with session 2 (unlike the previous situation of FIG. 1A when connection 1 was associated with session 1). The reason this may occur is because sessions may be stateless with regards to connections, and as such, it is quite possible for a specific session to be assigned to different connections at different points in time.

Figure 1E:
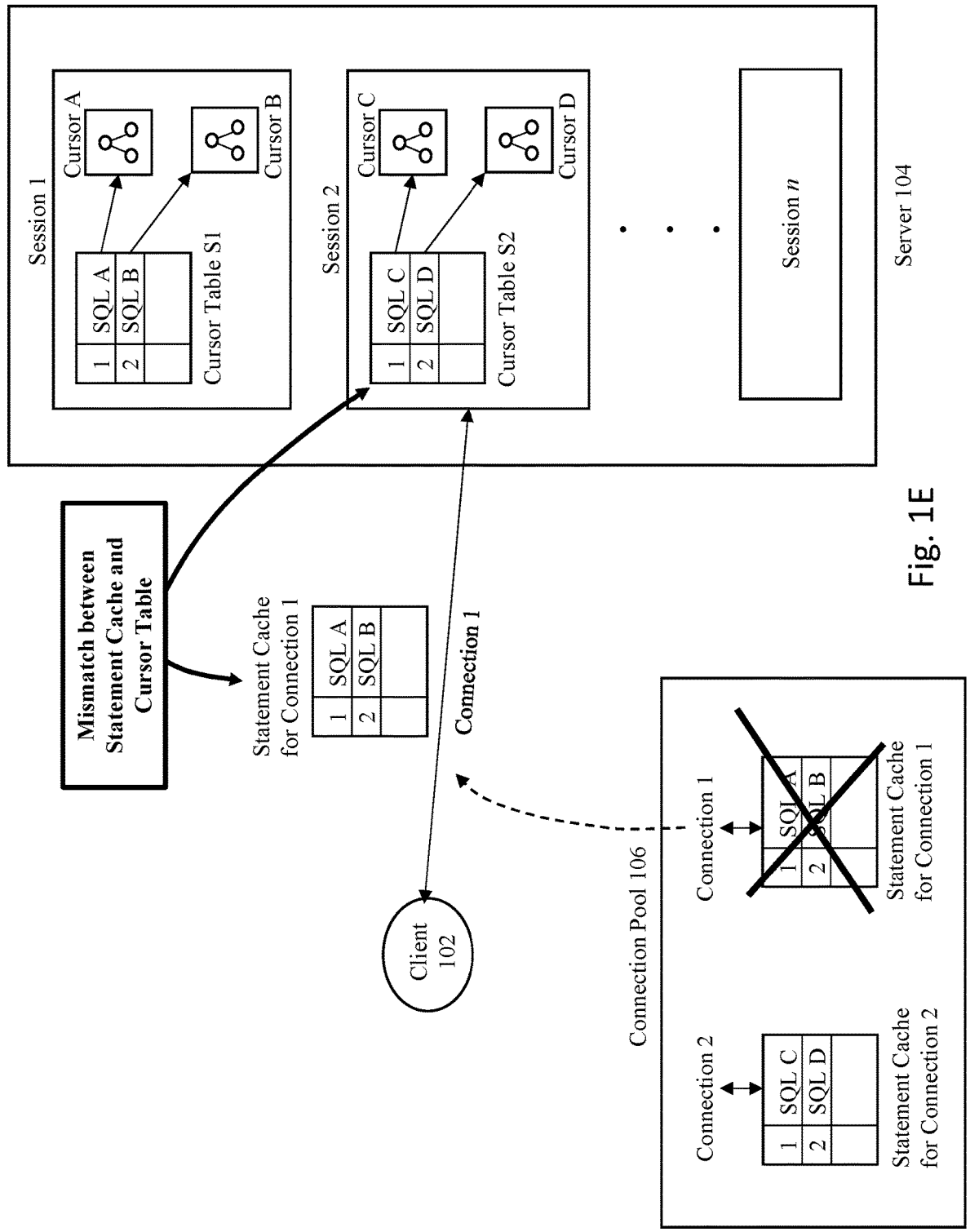

As shown in FIG. 1E, this situation may result in a mismatch between the cursor identifiers maintained in the client-side statement cache and the cursor identifiers in the server-side cursor table. For example, assume again that the user currently using connection 1 seeks to execute SQL A. The system may hash the contents of SQL A to identify the specific entry in the statement cache of connection 1 that is associated with SQL A. Here, the first entry in the statement cache for connection 1 is associated with SQL A ("Select ename from EMP;"). The cursor identifier "1" for SQL A can thus be identified. At this point, the client would send the cursor identifier "1" through connection 1 to session 2. The value of the cursor identifier "1" would be used to search through and identify the corresponding entry in the cursor table S2 that has the same cursor identifier.

The issue is that the identified entry in the cursor table S2 for cursor identifier "1" is SQL C ("Select e_no from EMP;")—not the SQL A ("Select ename from EMP;") that was the query sought by the user. Therefore, if the reference for this entry in the cursor table S2 is followed to execute the existing cursor object for Cursor C, this would lead to numerous problems associated with executing the wrong query, e.g., wrong data tables, type mismatches, etc. Here, the client is expecting a string (ename) for SQL A while the proxy or server will end up sending it a number (e_no) for SQL C.

Therefore, in a typical system, this type of problem would lead to the conclusion that client connections can no longer use statement caches after such connection/session re-assignments. This is the reason why a client in the prior art would clear its statement cache (the SQL text to cursor number mapping) every time it returns a connection to the connection pool. At the same time, the server also closes the corresponding cursors. Subsequently when the client acquires a connection again from the connection pool, it sends the SQL text again to the server and the server then has to perform the heavy task of parsing/analyzing and building the cursor object again from scratch causing a serious drain on server time and resources (e.g., CPU and memory resources). This would result in excessive and expensive resource usage and waste, since the database would need to request the server to perform over and over again the heavy lifting required to perform parsing and semantic checking of the statements.

Embodiments of the invention resolve these problems, and allow for the client to continue to use a cursor to SQL mapping (statement cache) even after a return of a connection to the connection pool.

Figure 2:
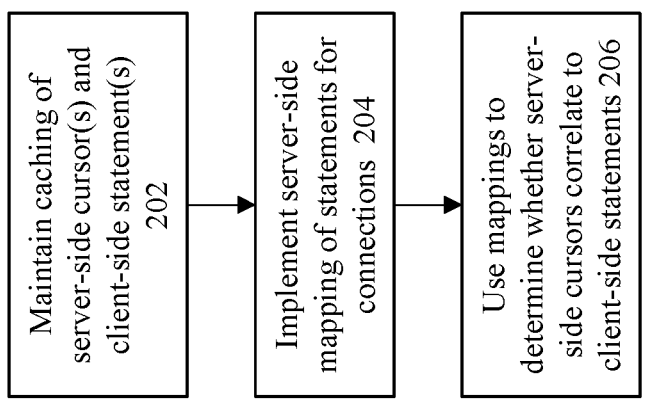
FIG. 2 shows a flowchart of an approach to implement embodiments that addresses and resolves the problems shown in FIGS. 1A-E.

FIG. 2 shows a flowchart of a technique that addresses and resolves the above-identified problems. At 202, caching is maintained of the server-side caches and the client-side statements. These structures may be maintained as previously described, e.g., where there is a client-side statement cache and server-side cursor tables and cursor objects. It is noted that these structures do not necessarily need to be changed to implement embodiments of the invention, and thus the inventive aspects described below may be used in conjunction with existing database caching structures.

At 204, server-side mappings will be maintained of statements, where these mappings are associated with specific connections. In effect, connection-based caching of statements will now also occur at the server side. These cached mappings will survive re-assignments of connections and sessions, and as described in more detail below, can be used to identify whether newly associated sessions for the connection have cached cursors that can be shared for new connections.

At 206, the mappings are used to determine whether existing cached cursor objects can be used to execute a statement. This works by using the mappings to check the SQL statements themselves, rather than just checking the cursor identifiers. The cursor identifiers are still useful, but at the server-side are used to identify the SQL statement intended for execution. The identified SQL statement can then be checked to see if there is an existing cursor object cached for that statement. If so, then cursor sharing can be used to execute the desired query.

Therefore, the embodiments of the invention avoid the need to clear the statement cache across session releases to the database session pools. Instead, applications can retain their statement cache while still leveraging the benefits of server based pooling solutions. This provides a performance improvement to the end applications as well as reduced CPU/memory usage on the database, since less time and resources need to be spent for parsing and analyzing of statements. As such, by making the caching intelligent in the database tier, the end applications can continue to use the benefits of statement caching at the same time leveraging DB-based pooling solutions.

While the current illustrative examples are described in the context of client-server arrangements, it is noted that the inventive concepts described herein can also be used in other contexts as well. For example, the invention may be applied to client-proxy interactions, where connection/session pooling at proxies are enhanced with similar intelligent caching at the proxy-side. Therefore, while specific examples are shown and described herein with respect to client and servers, the invention is not to be limited to just this context unless specifically claimed as such.

Figure 3:
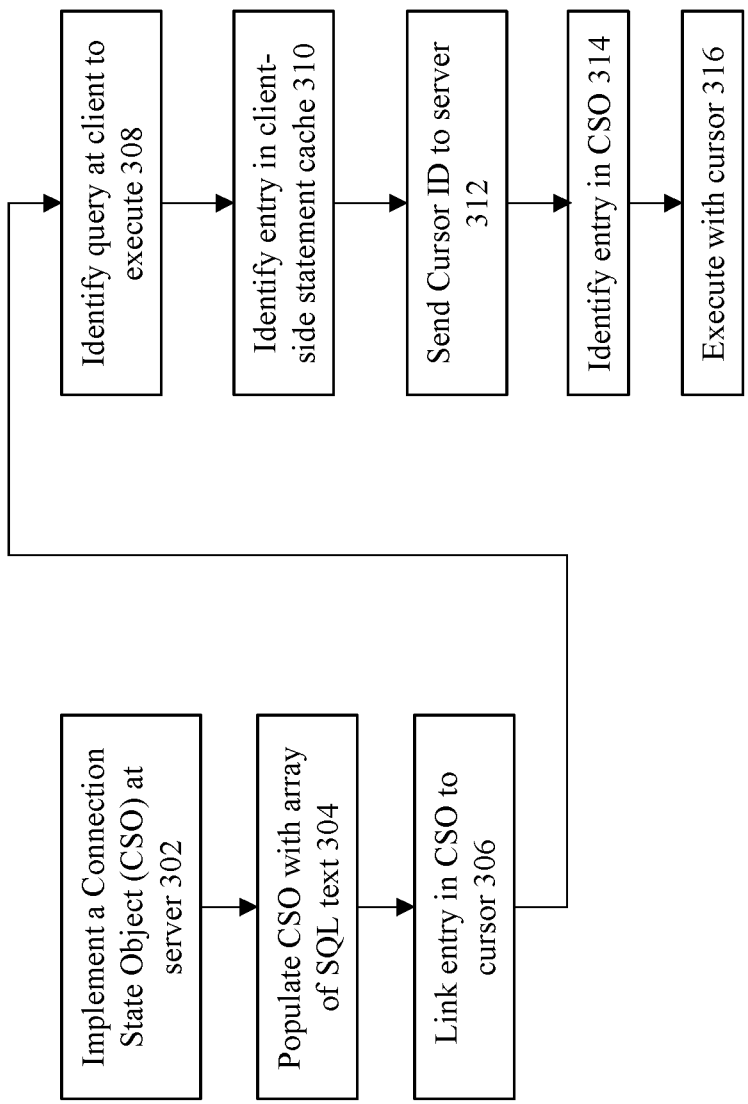
FIGS. 3 and 4 provide a detailed explanation for implementing server-side statement caching for connections according to some embodiments of the invention.
Figure 4:
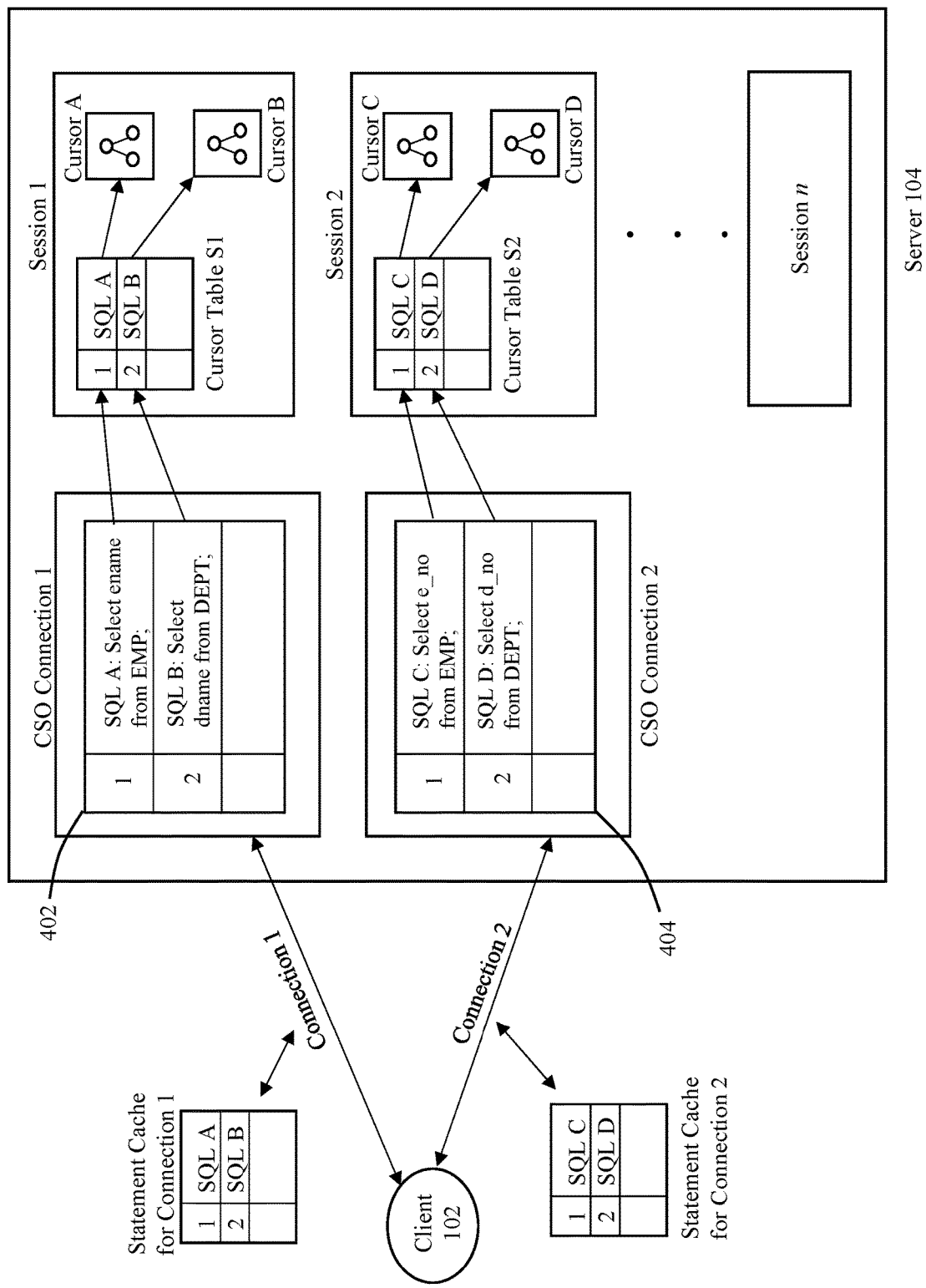

FIGS. 3 and 4 together provide a more detailed explanation for implementing server-side statement caching for connections according to some embodiments of the invention.

At 302 in FIG. 3, a connection state object (CSO) is implemented at the server-side. The CSO is an object maintained at the server that holds information about the connection. The key aspect that needs to be remembered about the CSO is that this object is tied to a specific connection, but is maintained at the server-side. Therefore, each connection will be associated with its own CSO at the server.

At 304, the CSO is populated with an array of SQL text that corresponds to previous SQL statements that have previously been executed using that connection. In some embodiments, this is implemented as a table that is indexed by the cursor number into the CSO. Essentially, each entry in this table includes a first column for the cursor identifier number, a second column to hold the SQL text for a statement associated with the cursor number, and a reference to any associated cursor objects.

At 306, an entry in the CSO for a given cursor identifier is linked to its associated cursor object. This occurs by mapping the SQL text for the cursor identifier to a cursor maintained by the server. In this way, regardless of the identifiers that were previously associated with any of the cursor objects, by looking at the SQL text itself, the system can identify which if any of the cursor objects should be associated with the cursor identifiers maintained in the CSO.

FIG. 4 provides an illustrative example of this approach to implement CSOs according to some embodiments of the invention. Each connection is associated with a CSO at the server. Here, connection 1 is associated with the CSO for connection 1 at the server. Similarly, connection 2 is associated with the CSO for connection 2 at the server.

Each CSO for a given connection includes a table with one or more entries, each of which maps to a respective corresponding entry in the statement cache for that same connection at the client-side. For example, the CSO for connection 1 includes a table 402 that maintains a mapping for each of the entries in the statement cache for the same connection at the client side. For instance, the entry for cursor identifier "1" in the client-side statement cache for connection 1 is associated with SQL A. This entry corresponds to its associated entry in table 402 for cursor identifier "1", which includes the SQL text for this SQL A ("Select ename from EMP;"). In this example, the entry in the CSO includes (either directly or indirectly) a reference to its associated cursor object (Cursor A). Similarly, the entry for cursor identifier "2" in the client-side statement cache for connection 1 is associated with SQL B. This entry corresponds to its associated entry in table 402 for cursor identifier "2", which includes the SQL text for this SQL B ("Select dname from DEPT;"). This entry in the CSO includes a reference to its associated cursor object (Cursor B).

Similar structures are also maintained for connection 2. The entry for cursor identifier "1" in the client-side statement cache for connection 2 is associated with SQL C. This entry corresponds to its associated entry in table 404 for cursor identifier "1", which includes the SQL text for this SQL C ("Select e_no from EMP;"). In this example, the entry in the CSO includes a reference to its associated cursor object (Cursor C). Similarly, the entry for cursor identifier "2" in the client-side statement cache for connection 2 is associated with SQL D. This entry corresponds to its associated entry in table 404 for cursor identifier "2", which includes the SQL text for this SQL D ("Select d_no from DEPT;"). This entry in the CSO includes a reference to its associated cursor object (Cursor D).

Returning back to FIG. 3, consider when an instruction is issued at the client for executing a query. At 308, a query is identified at the client for execution. At 310, an entry is identified in the client-side statement cache for the connection. This action is performed to identify the cursor identifier that is associated with the requested query. At 312, the identified cursor number is sent to the server to perform execution of the query.

At 314, a determination is made of the corresponding entry within the CSO for that connection. This is performed by looking up the specific entry within the CSO that corresponds to the same cursor identifier number. For the moment, assume that the entry in the CSO is already linked to the correct cursor object (the situation when this link does not already exist will be discussed below with respect to the description of FIG. 7). Thereafter, at 316, the linked cursor will be used to execute the query.

By way of illustration for this processing flow, consider if a query is issued by the user associated with connection 1 in FIG. 4 to execute a query for "Select ename from EMP;", which corresponds to SQL A. This SQL text will be hashed within the statement cache for connection 1 to identify the first entry in the statement cache associated with cursor identifier "1".

This cursor identifier "1" will then be sent to the server—without sending the full SQL text—and used to perform a lookup within the CSO for connection 1. It is noted that this entry in the CSO is currently linked to a cached cursor object (Cursor A). Therefore, the cached cursor is identified as the cursor that should be used to execute the query on behalf of the client.

In the normal operational situations when the system has achieved a "steady-state" of having all or most of the cached statements in CSOs linked to cached cursor objects, processing of all or most queries will operate as described, and thus will allow the client-side statement caches to be easily used without the requirement to perform the expense of parsing of SQL statements at the server.

Now consider the situation when a connection/session is freed up, and thus an association between a given connection and a given session is broken. FIGS. 5 and 6A-C will describe this situation.

Figure 5:
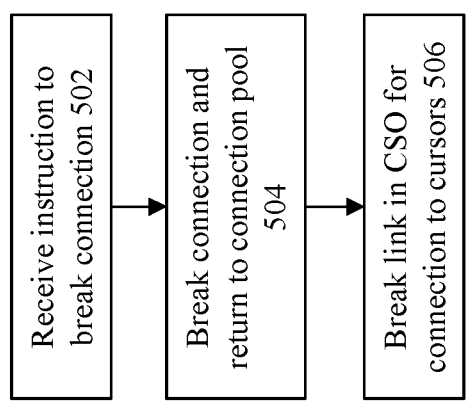
FIGS. 5 and 6A-C illustrate when a connection/session is freed up.

In FIG. 5, step 502 is performed to receive instructions to break a connection. This may occur, for example, when a user/client has completed a set of work that was associated with a current connection. At 504, the connection is de-allocated, and returned back to the connection pool.

At 506, any links that were previously configured in the CSO to cursor objects in the session are now broken. The reason this step is taken is because the connection will eventually be re-allocated again in the future, and it is possible that the connection when re-allocated will be associated with another database session. Therefore, any references/links in the CSO to the current database session will have to be removed to anticipate the fact that the links to cursors in the CSO will not be valid if the connection is re-established to a different session.

Figure 6A:
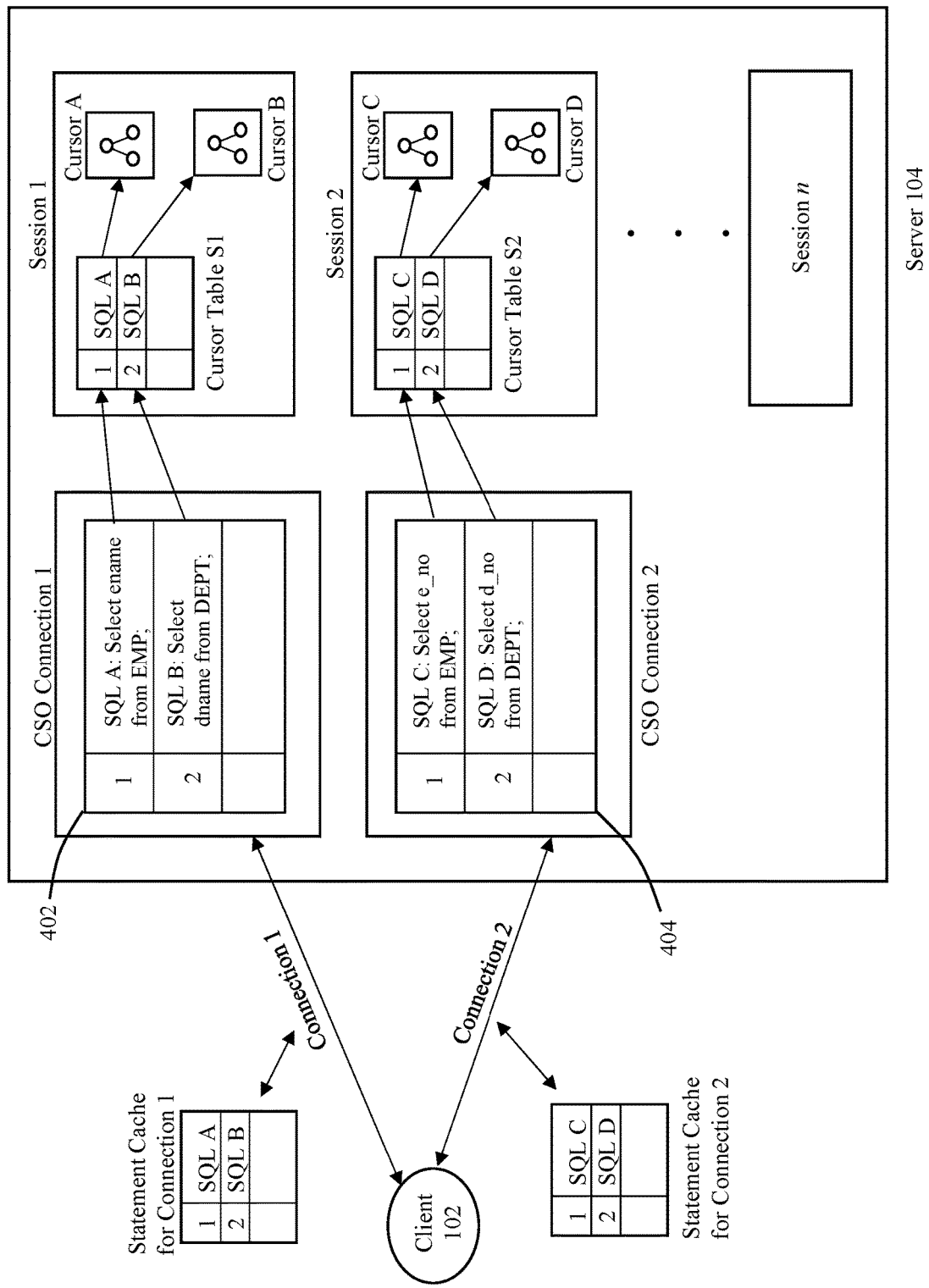
Figure 6B:
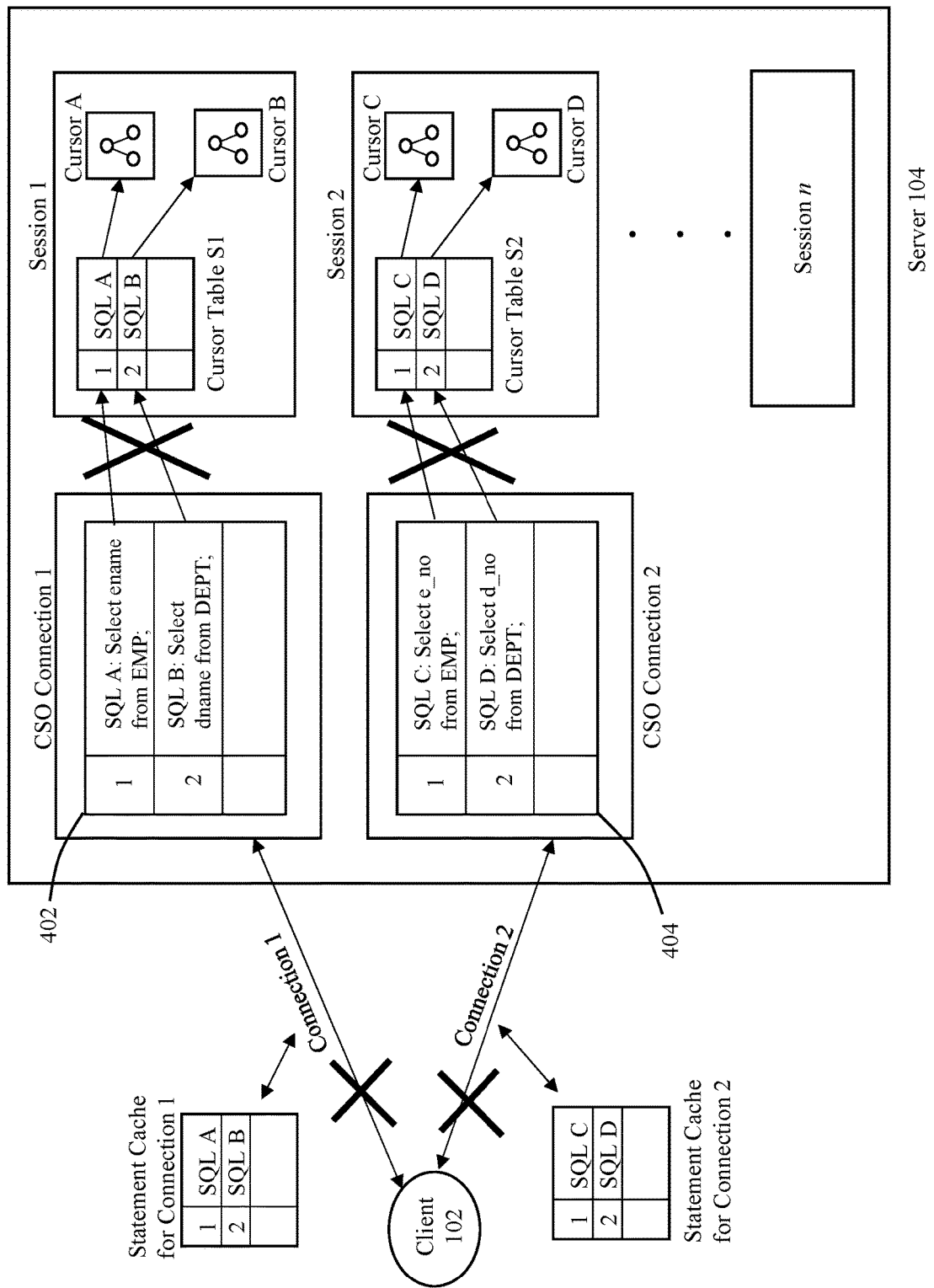
Figure 6C:
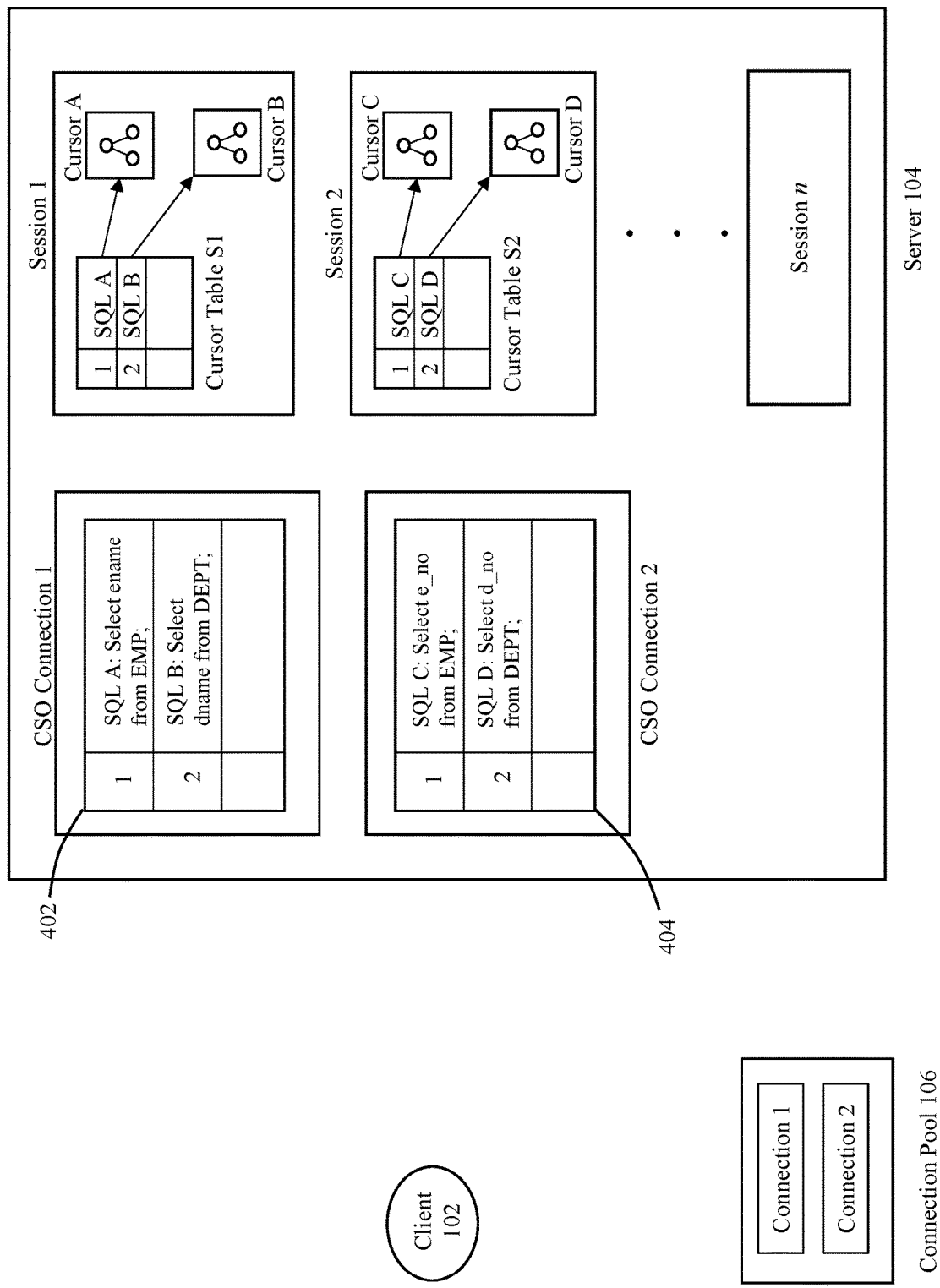

FIGS. 6A-C illustrate this process. FIG. 6A shows when connection 1 is currently associated with session 1 and connection 2 is associated with session 2. In the current situation, the CSO for connection 1 includes links to cached cursor objects in session 1, and the CSO for connection 2 includes links to cached cursor objects for session 2.

FIG. 6B shows when connections 1 and 2 are released back to the connection pool. Here, the connections 1 and 2 are broken between the client 102 and the server 104. In addition, the links in the CSO for connection 1 to cached cursor objects in session 1 are broken. The links in the CSO for connection 2 to cached cursor objects in session 2 are also broken.

As shown in FIG. 6C, the connections 1 and 2 have now been returned to the connection pool 106. In addition, since none of the database sessions are currently associated with any connections, the CSOs for the connections do not have any references to the cursors objects within any of the database sessions.

After the client had released the connections back to its connection pool, the client may later choose to check out connections again from its connection pool. FIGS. 7 and 8A-K describe what occurs when this happens.

Figure 7:
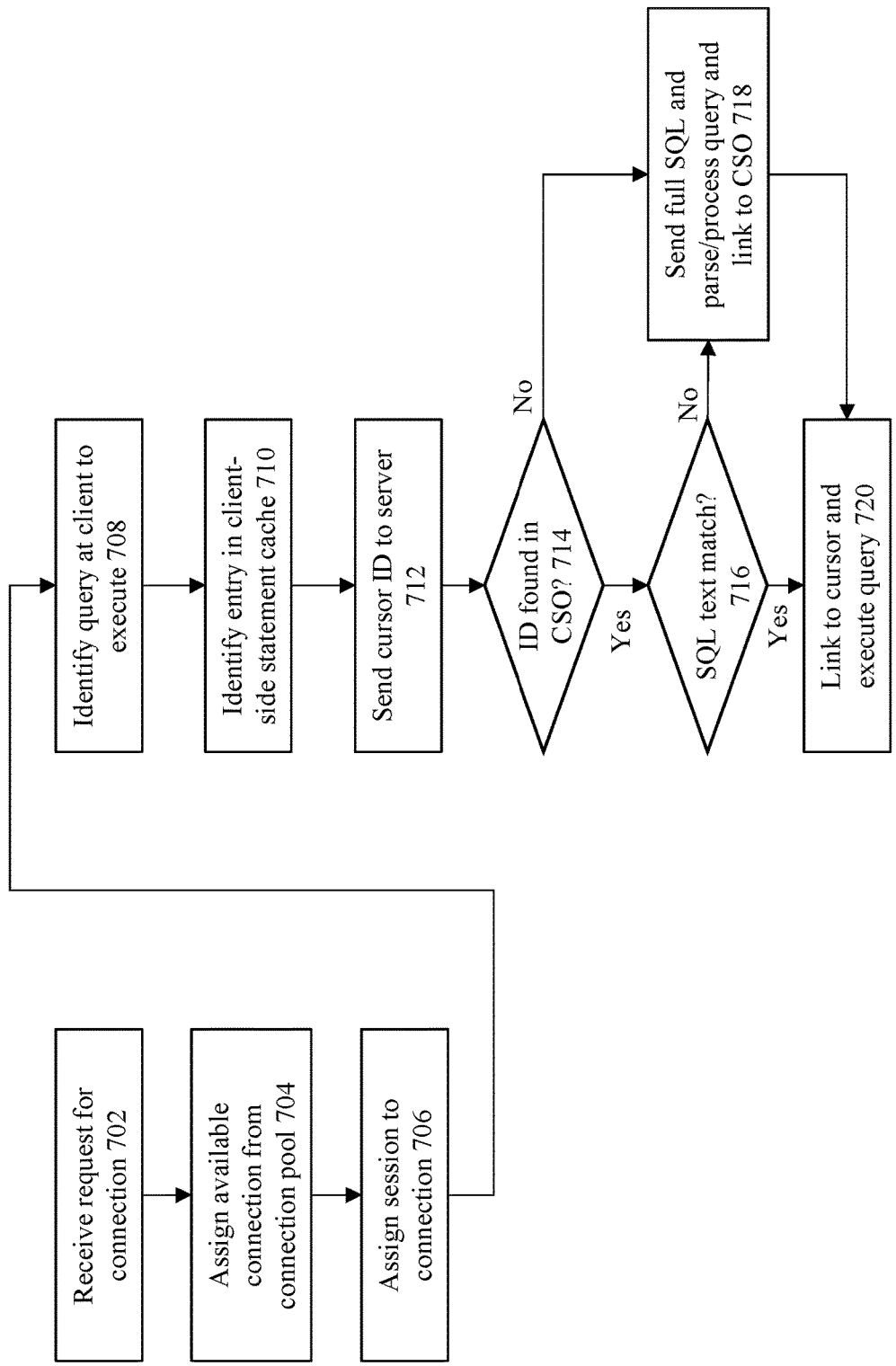
FIGS. 7 and 8A-K illustrate an approach to handle when a client obtains a connection to a session according to some embodiments.

During the setup phase, at 702 in FIG. 7, a request is received from the client to check out a connection from the connection pool. At 704, an available connection from the connection pool is assigned to the client. At 706, an available session from the session pool is assigned for the newly assigned connection/client.

During an in-use phase, at 708, a query statement is identified for execution at the client. At 710, the query statement is used to identify the corresponding entry for that statement in the client-side statement cache, which can be used to identify the cursor identifier for that query statement for this current connection.

At 712, the cursor identifier is sent to the server. At 714, the server will then consult the array of SQL text in the CSO to check if the SQL text is present for the corresponding cursor number. If the answer is "yes" at 714, then the cursor table is consulted at 716 to check if there is a cursor corresponding to the SQL text. Cursor tables are generally implemented as hash tables and so checking for the presence of SQL text will not normally add significant performance overhead to the system processing. If there is a match, then a link/reference is entered into the CSO for the cursor object and used to execute the query at step 720.

However, if the server session does not yet have a saved cursor object for the SQL text (e.g., the session is seeing the SQL for the first time), then the cursor table lookup will fail. At 718, the proxy/server then signals back a special condition to the client, and in response, the client will send the full execute request (e.g., SQL text and corresponding bind data) to the server. When this happens, the server will perform the process of parsing/analysis of the query to build the cursor object for that session.

Figure 8A:
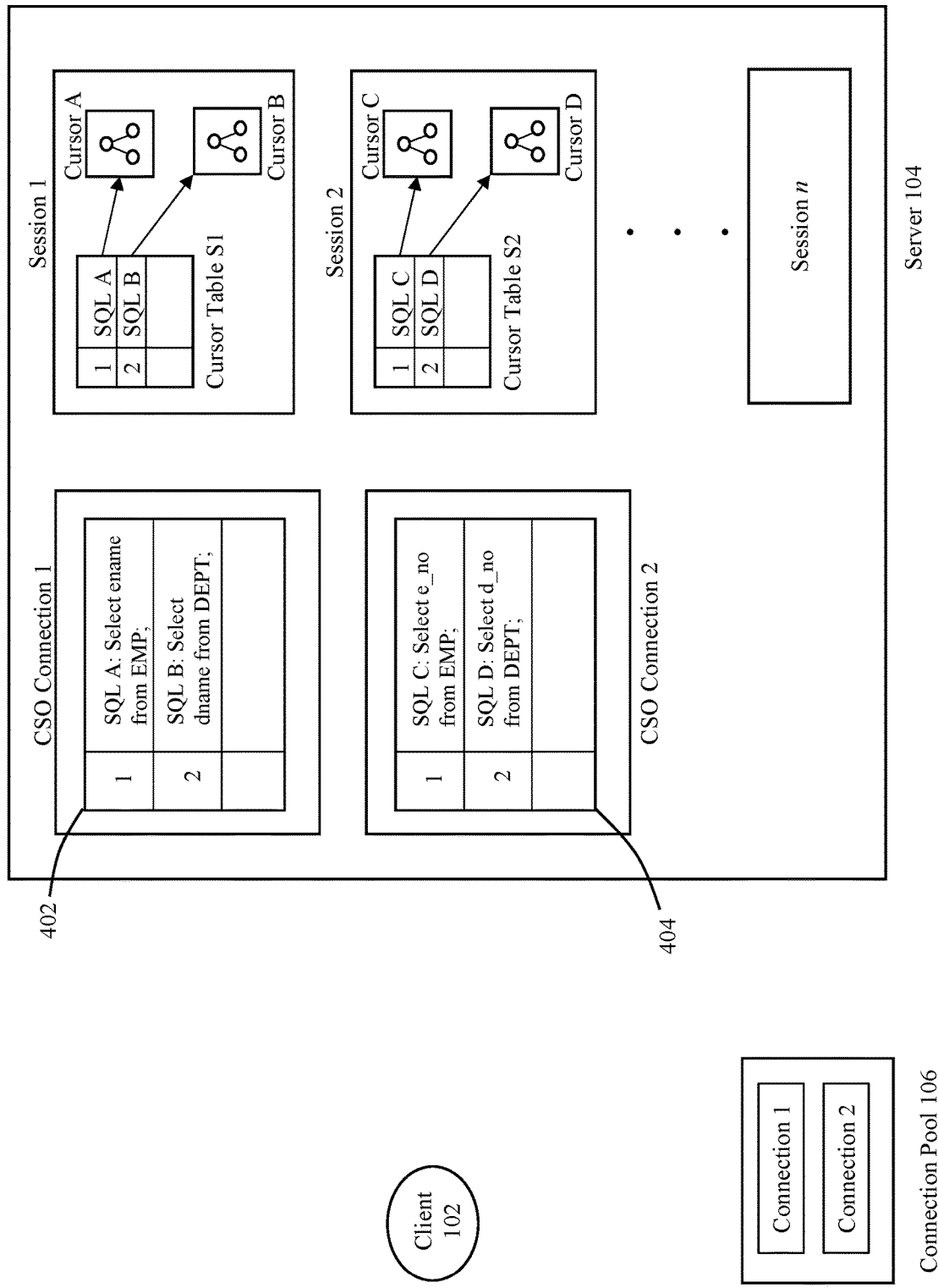
Figure 8B:
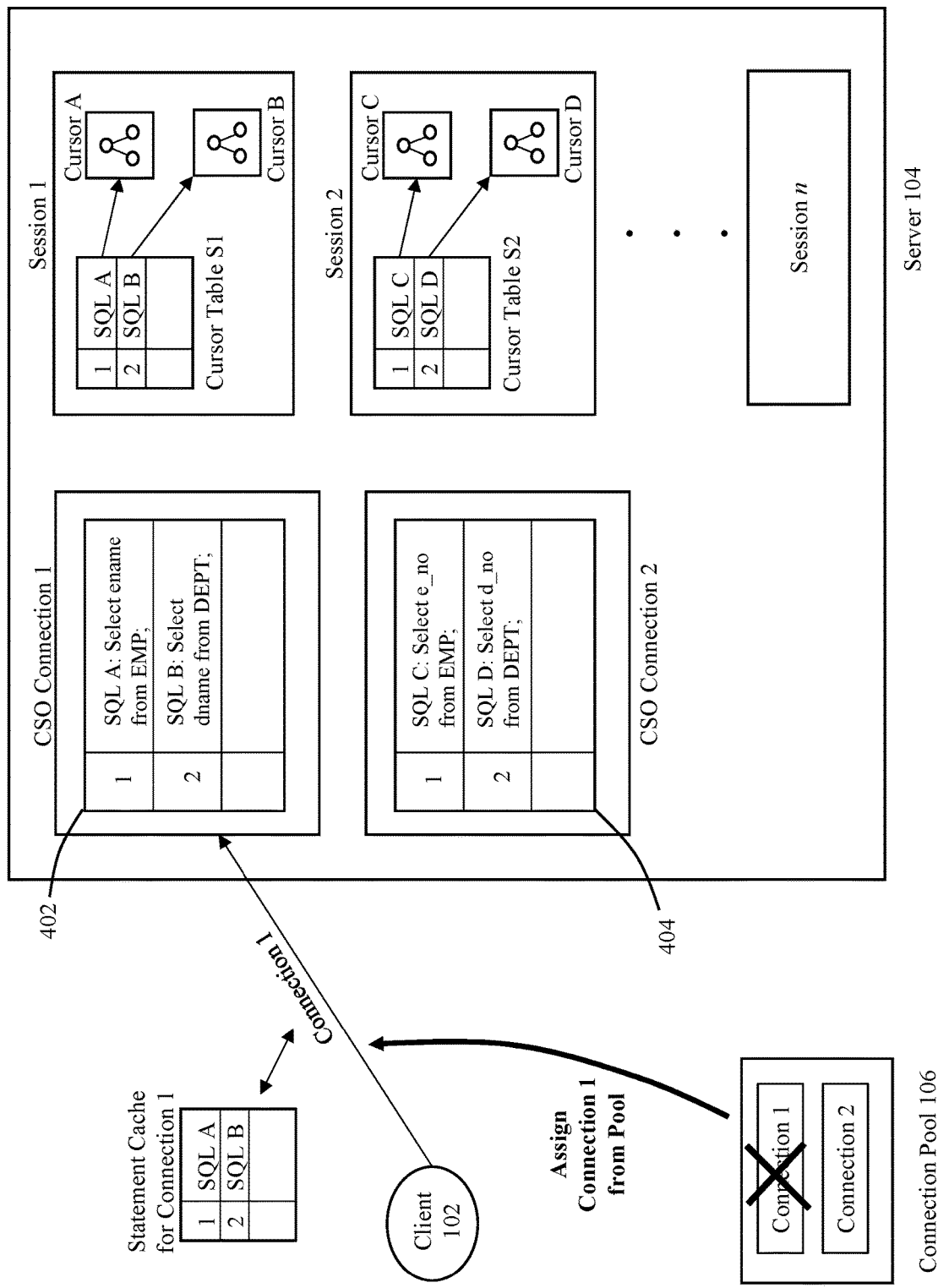

FIGS. 8A-K provide an illustration of this process. FIG. 8A shows the situation when connections 1 and 2 are still in the connection pool 106. At this point, client 102 has not yet re-established a connection to the server 104. FIG. 8B shows when client 102 has obtained connection 1 from the connection pool 106 and has used this connection 1 to establish a connection to the server 104.

One of the available sessions at the server 104 will now be assigned to the connection/client. At the current moment, both session 1 and session 2 are available to be assigned to the client.

Figure 8C:
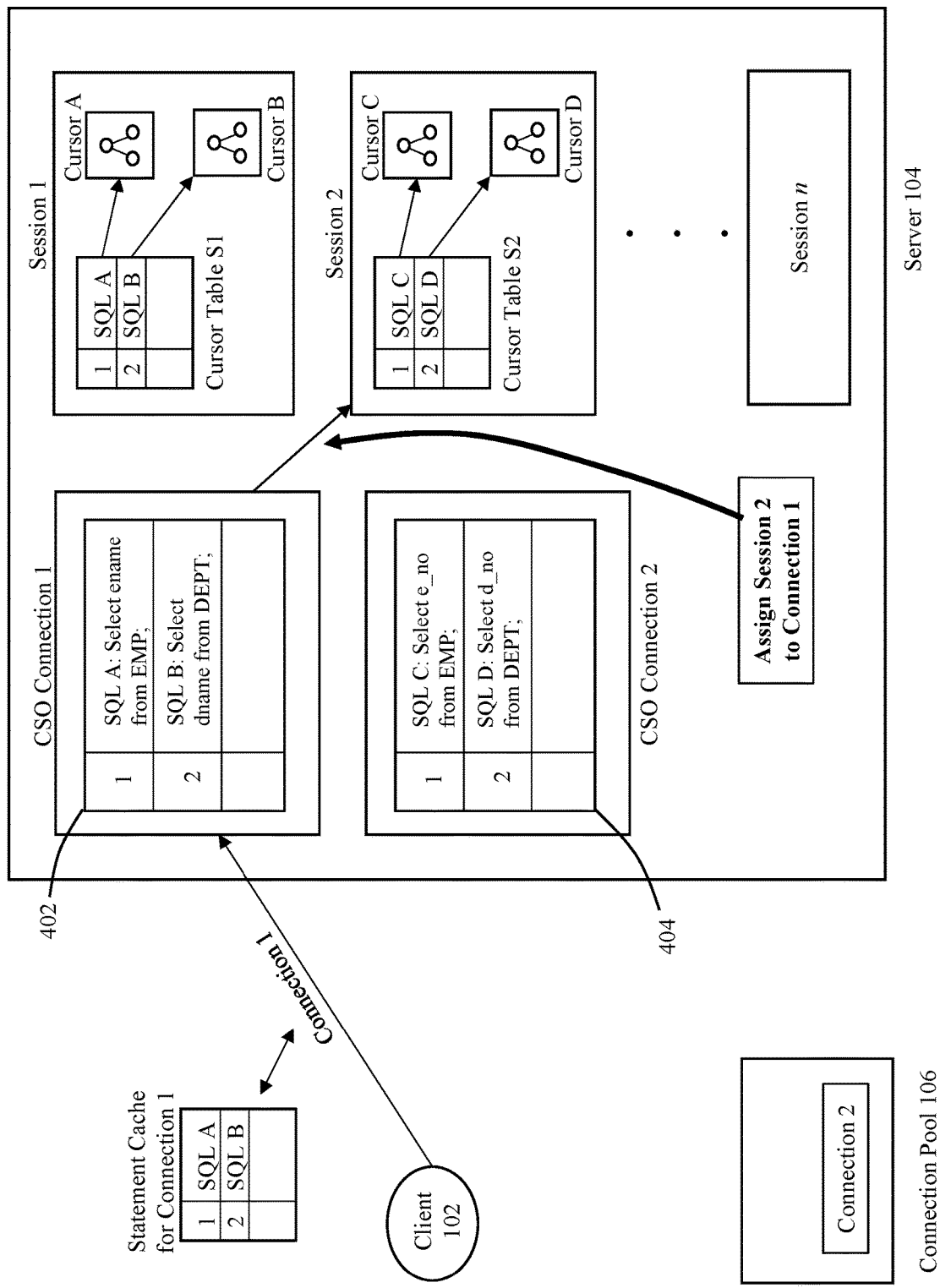

As shown in FIG. 8C, session 2 is now assigned to connection 1 for client 102. Recall that connection 1 was formerly associated with session 1, and connection 2 was formerly associated with session 2. This means that the connection 1 is now assigned to a different session. This means that the entries in the CSO for connection 1 (SQL A and SQL B) will not match the cursors that are currently cached for session 2 (Cursor C and Cursor D).

Figure 8D:
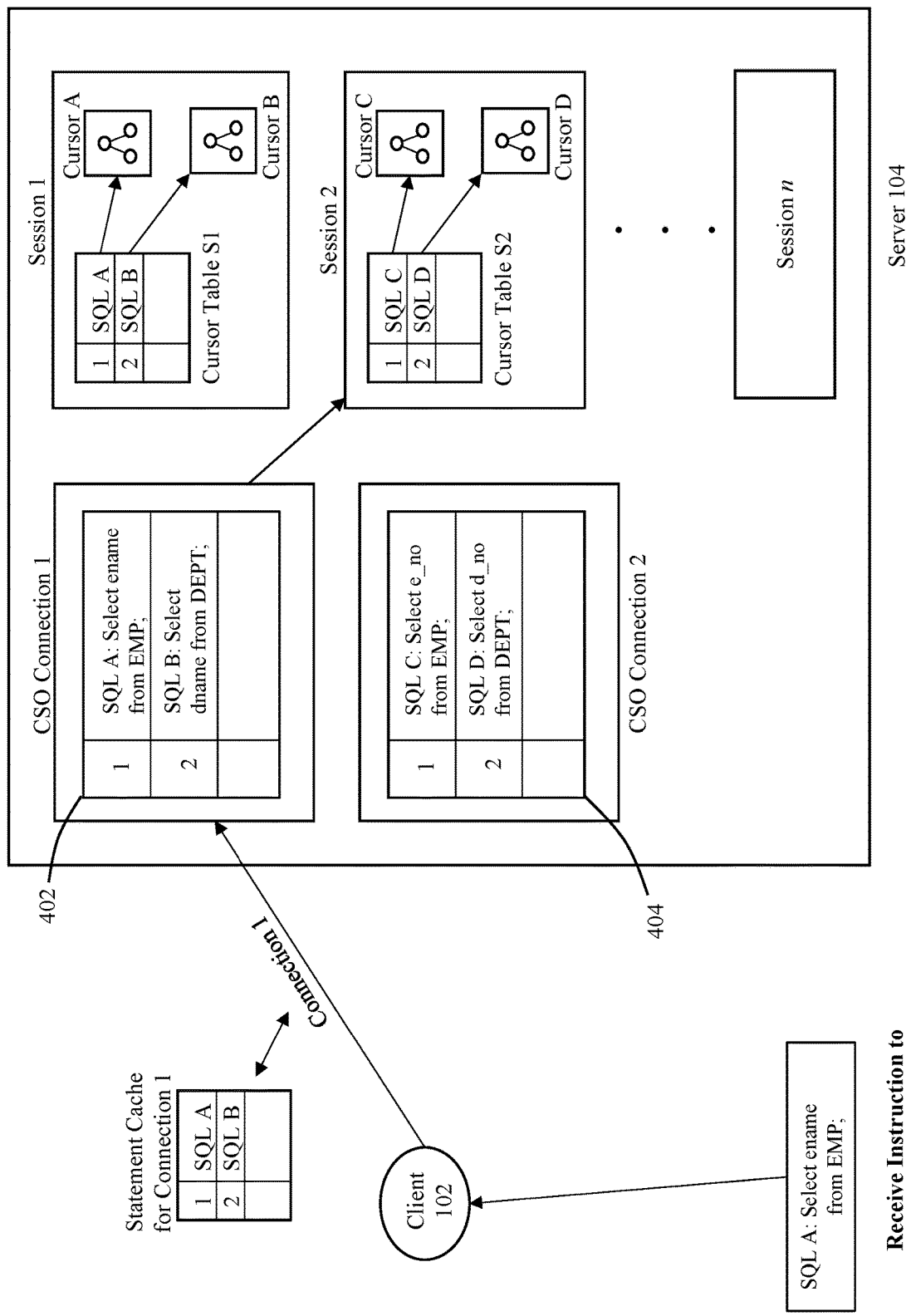
Figure 8E:
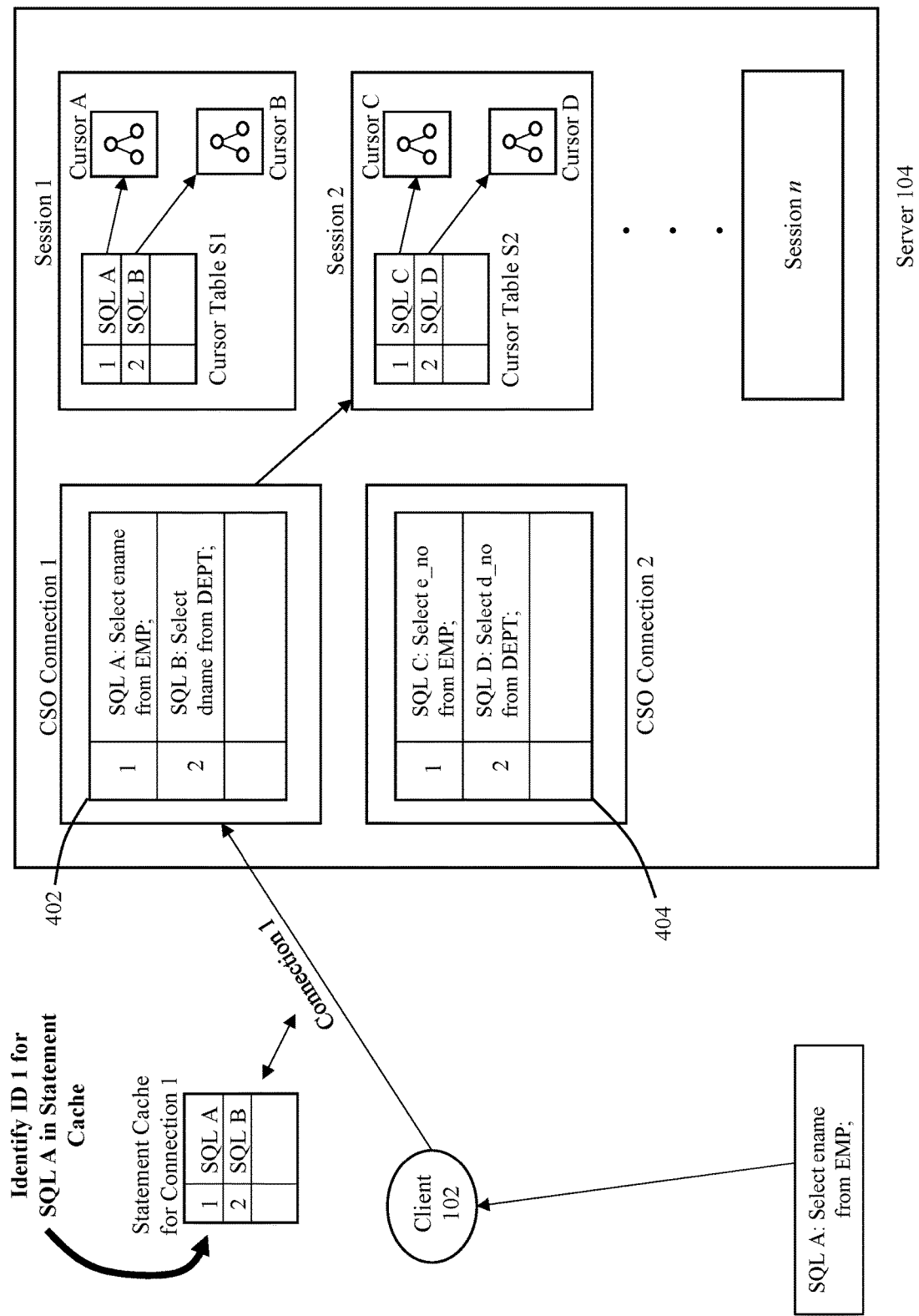

FIG. 8D illustrates that an instruction is received by the client 102 to execute SQL A. As shown in FIG. 8E, a lookup is performed into the statement cache for connection 1 to identify the cursor identifier associated with the request. Here, since the incoming request is to execute SQL A, the cursor identifier for this statement is "1".

Figure 8F:
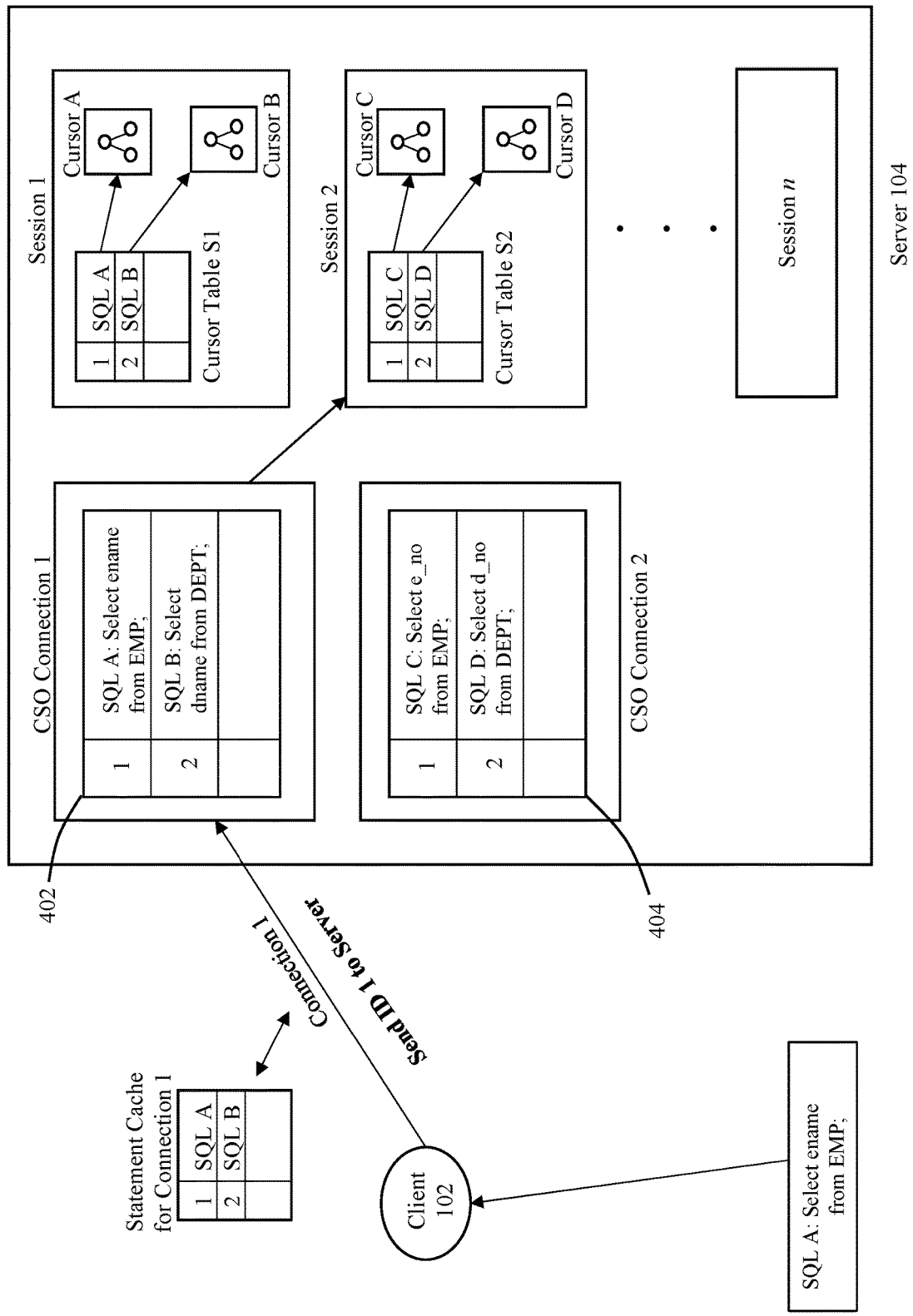
Figure 8G:
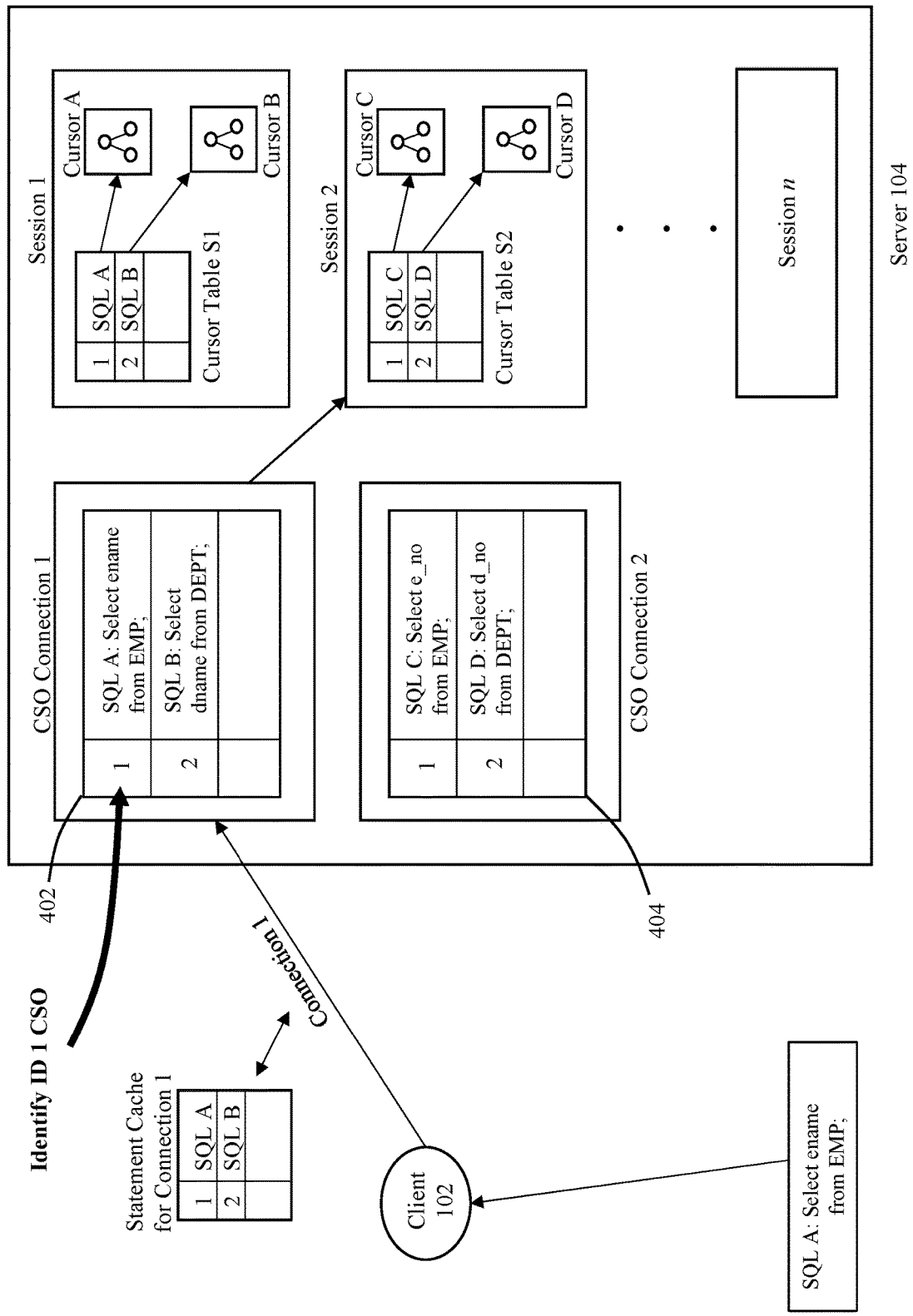

As shown in FIG. 8F, the cursor identifier "1" is sent from the client 102 to the server 104. FIG. 8G shows that a lookup is performed within the CSO for connection 1 to identify the entry for cursor identifier "1". The SQL text for this entry ("Select ename from EMP;") is then determined by obtaining the SQL for this query from the appropriate column within the CSO table.

Figure 8H:
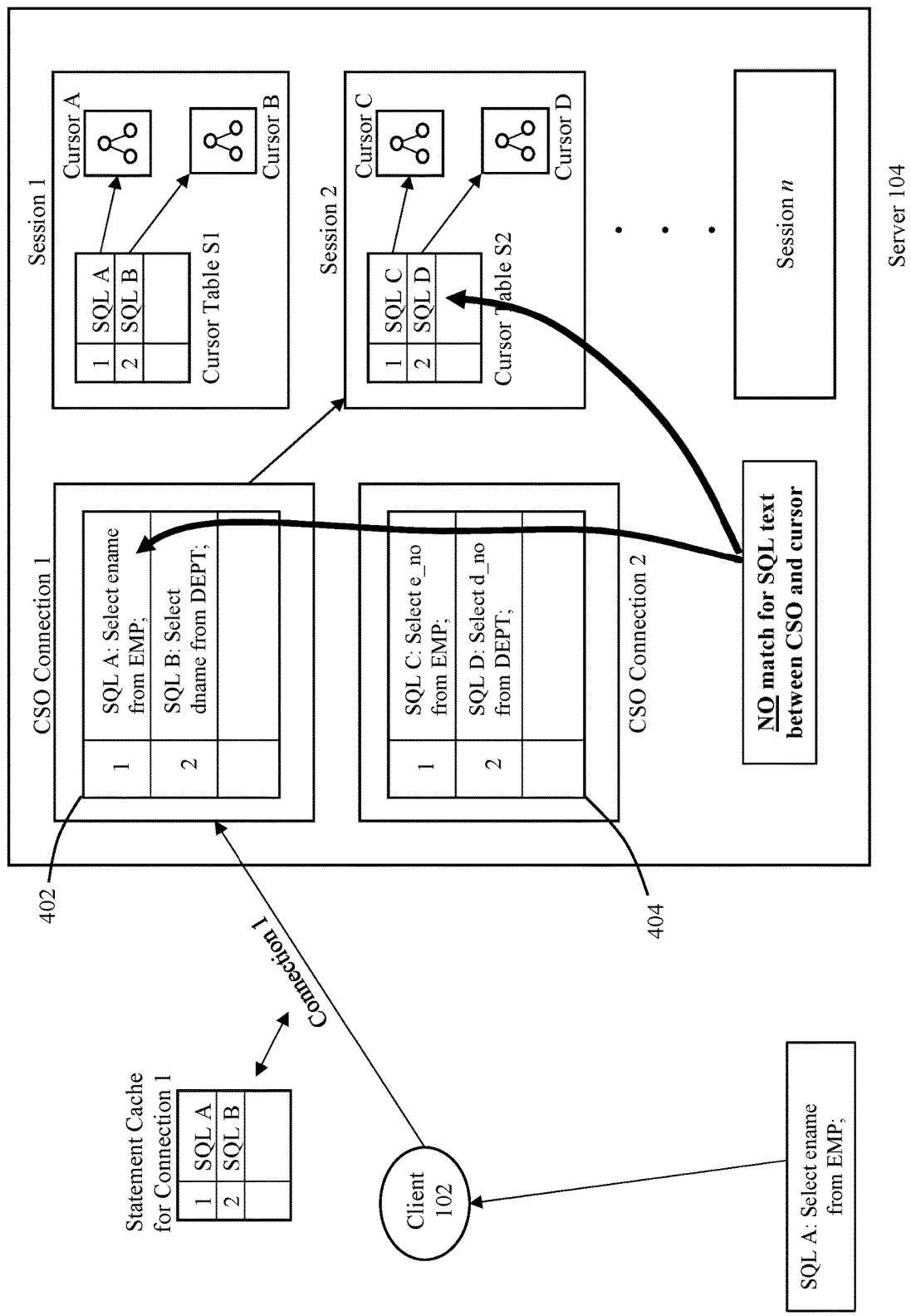

FIG. 8H shows that a check is made between the SQL text from the CSO and the cursor table S2 for session 2 to determine if there is a match between the SQL text for the CSO entry for cursor "1" ("Select ename from EMP;") and any entries in the cursor table S2 for session 2. This figure shows that there is no match for this SQL text among the saved cursors.

Figure 8I:
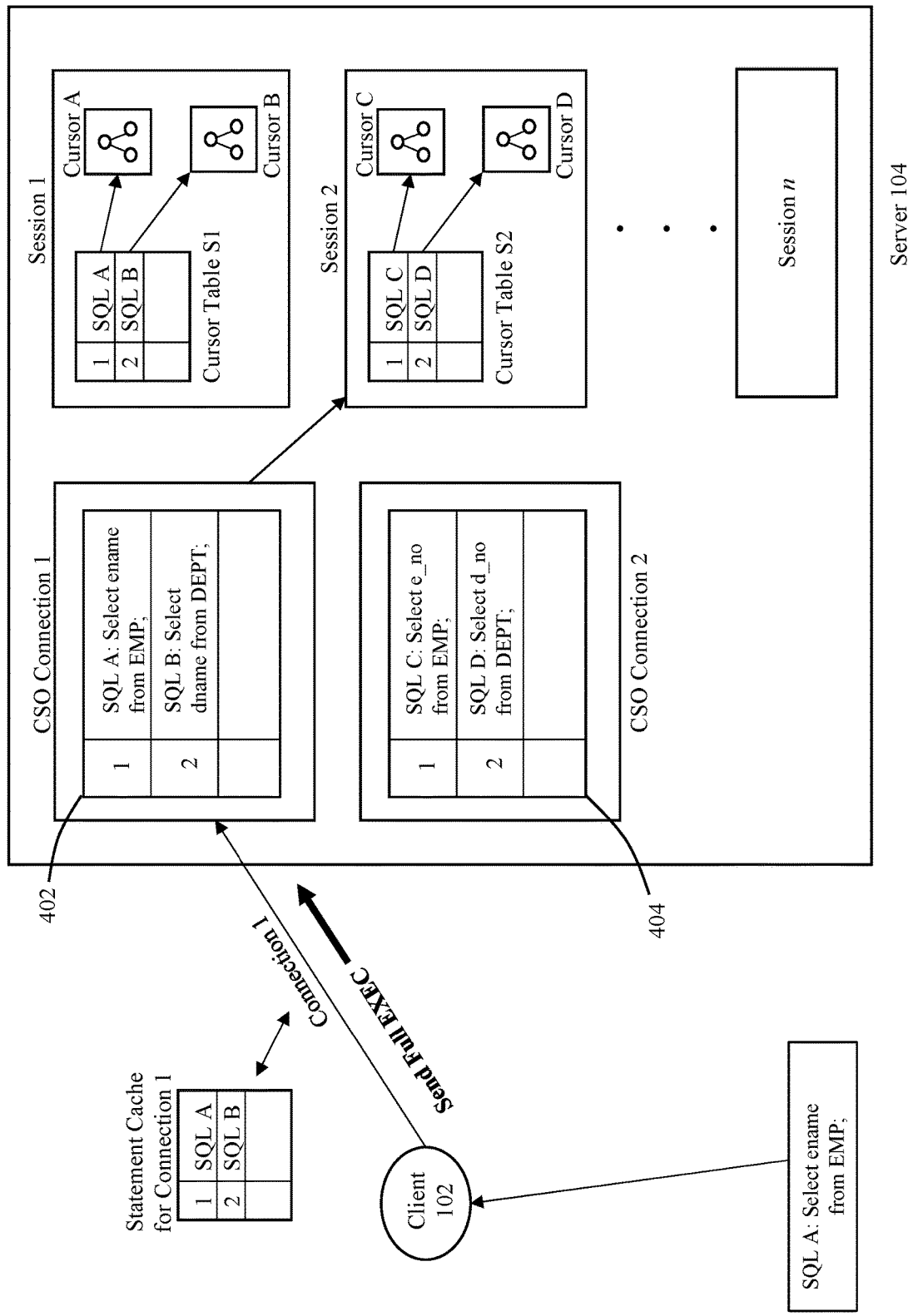
Figure 8J:
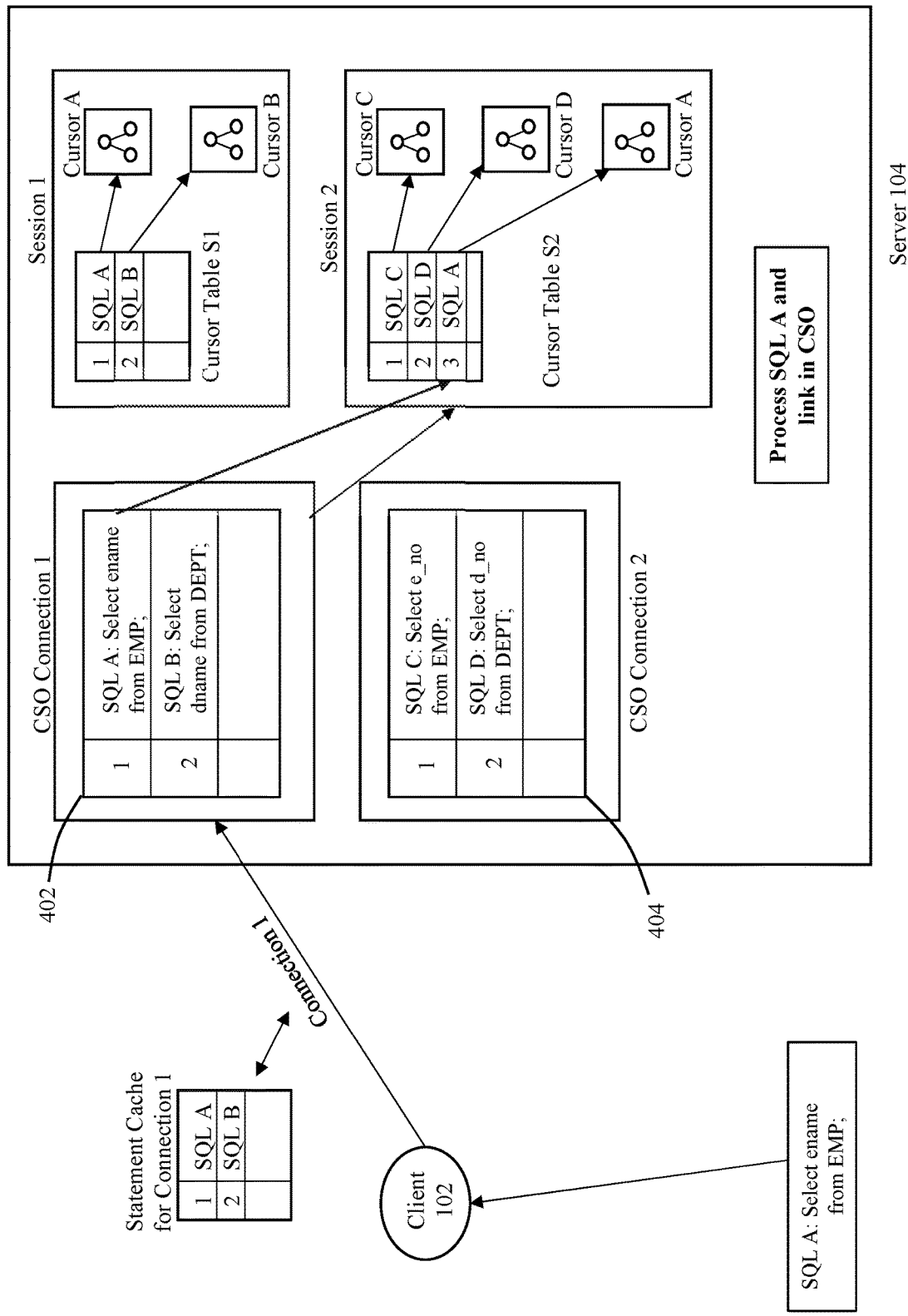
Figure 8K:
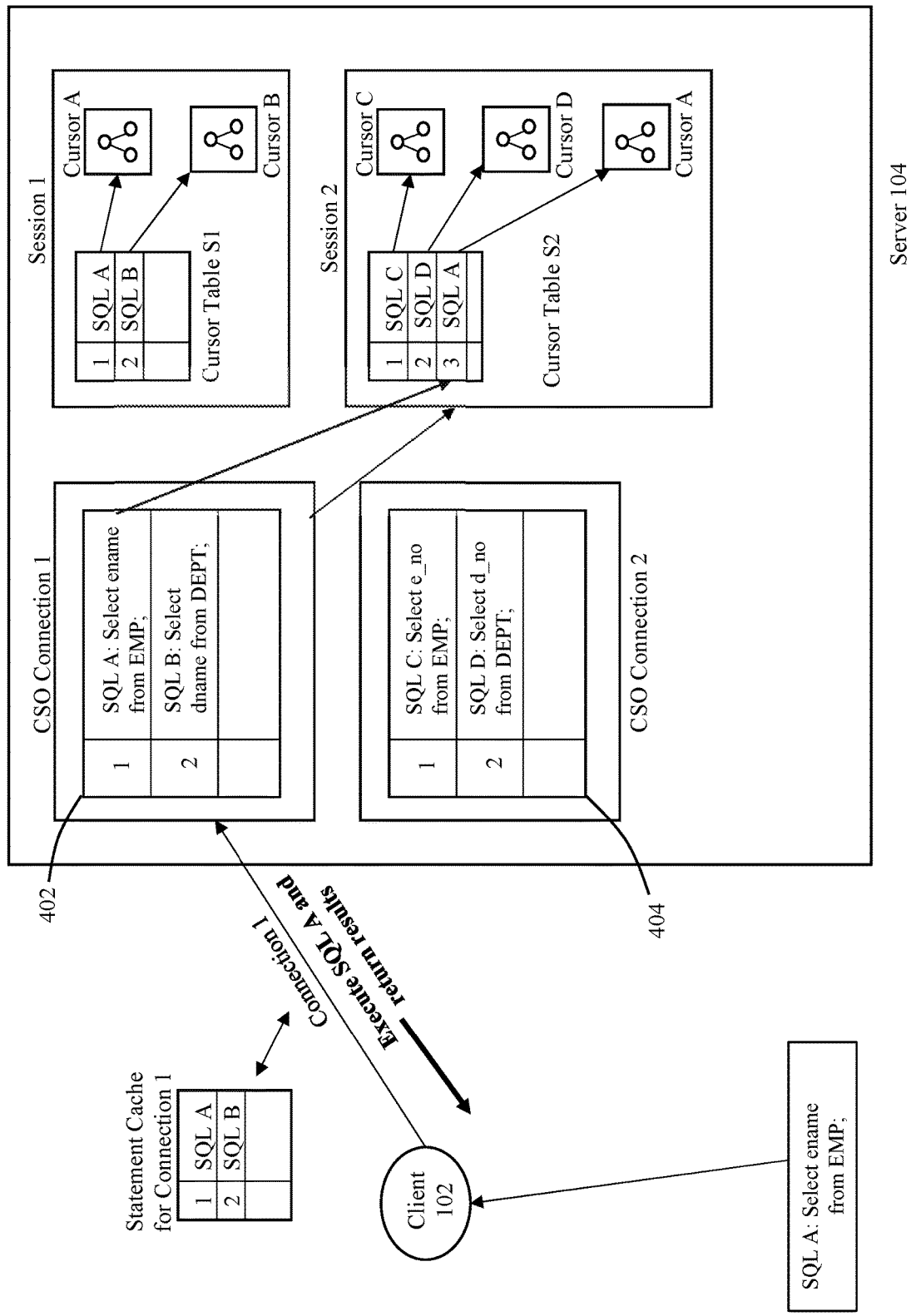

Therefore, as shown in FIG. 8I, the client 102 will send the full Exec for the SQL A statement to the server for processing. FIG. 8J shows that session 2 will undergo the process to create a cursor for SQL A, and therefore now has a cursor object for SQL A (Cursor A). A reference for this cursor in session 2 is created in the CSO for connection 1. Thereafter, as shown in FIG. 8K, the query is executed and the results set is returned back to the client 102.

While session 2 did have to expend additional computational costs to generate cursor A, it is noted that this expense by session 2 (and any other subsequent sessions that also need to create cursor A) is likely to be less costly than the original expense of creating cursor A by session 1 which first created cursor A in the database system. This is because the first session to create a cursor performs a "hard parse" while subsequent sessions likely only need to perform a "soft parse" for the same SQL text. The full process of parsing and compiling a new query is a hard parse, which may include steps such as a load of SQL into a shared memory space, a syntax parse, a sematic parse, query transformation, optimization, and execution creation. In contrast, a soft parse can leverage some of the actions of the hard parse, e.g., to avoid allocations of memory and other resources needed to load SQL text into a shared memory space.

With the present approach, the ongoing establishment of different connections with the different sessions will eventually create a "steady-state" condition where the client-side statement caches and server-side CSOs for those connections will include entries for all or most of the likely SQL statements to be executed in the system, and all/most of the various sessions will use soft parse processes to eventually generate and save cached cursors for those SQL statements. This means that early on, the cost of syntactic and semantic analysis may still be required, but will lessen over time until reaching eventual steady state, where in steady state, each server session would have executed at least once all the different SQL statements executed by the end application. No matter which session the client connection gets attached to, semantic and syntactic analysis for the SQL statements would have already been performed for the session and therefore doing it again will not be required.

Therefore, what has been described in an improved approach to implement cursor sharing in database systems, where a server-side mapping of cursor identifiers to SQL is maintained to allow for continued use of client-side statement caches even after connections and database sessions are returned to shared pools and then subsequently re-assigned. Embodiments of the invention avoid the need to clear the statement cache across session releases to the database session pools. Instead, applications can retain their statement cache while still leveraging the benefits of server based pooling solutions. This provides a performance improvement to the end applications as well as reduced CPU usage on the database, since less time and resources need to be spent for parsing and analyzing of statements.

System Architecture

Figure 9:
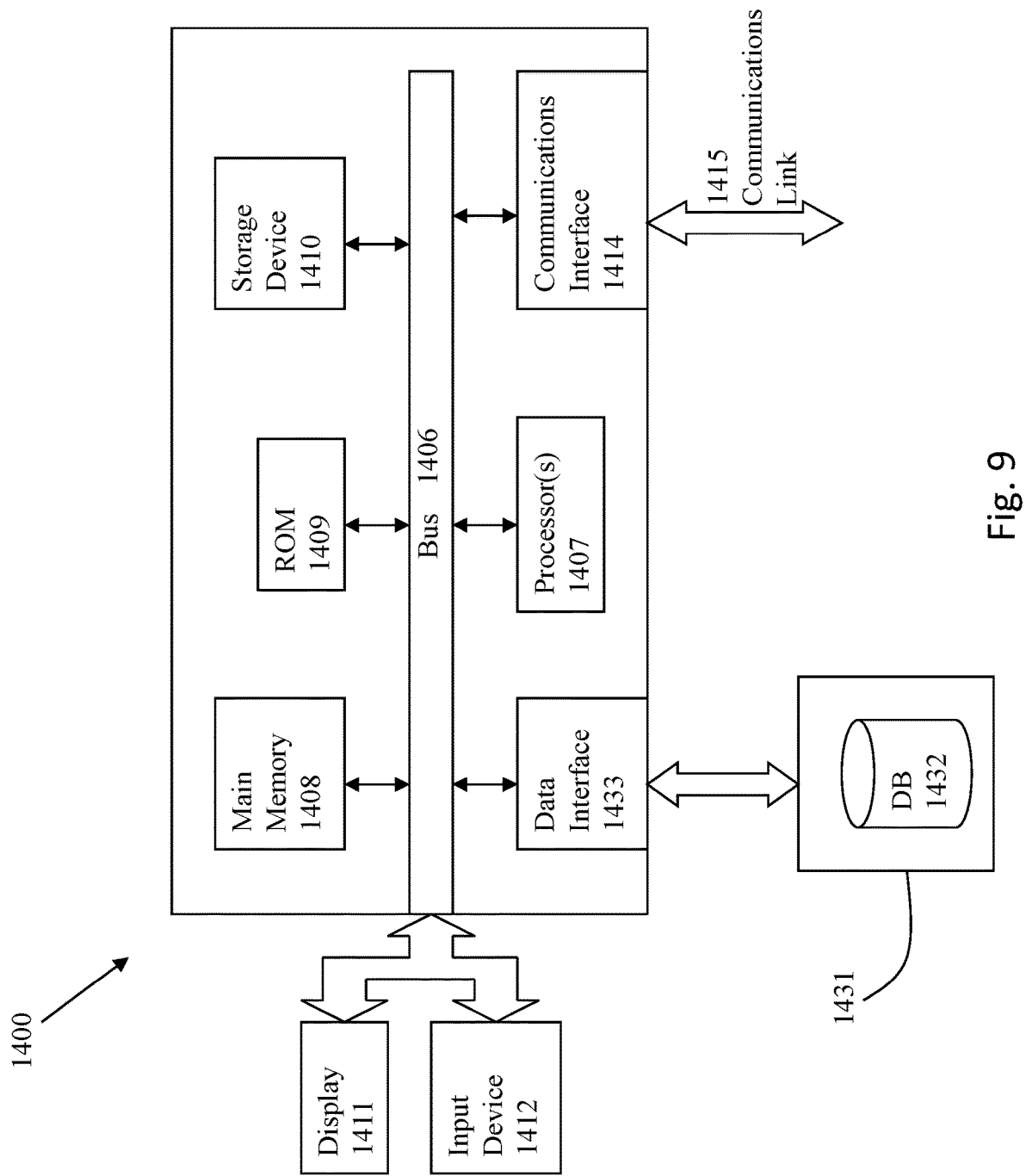
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1506 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 10:
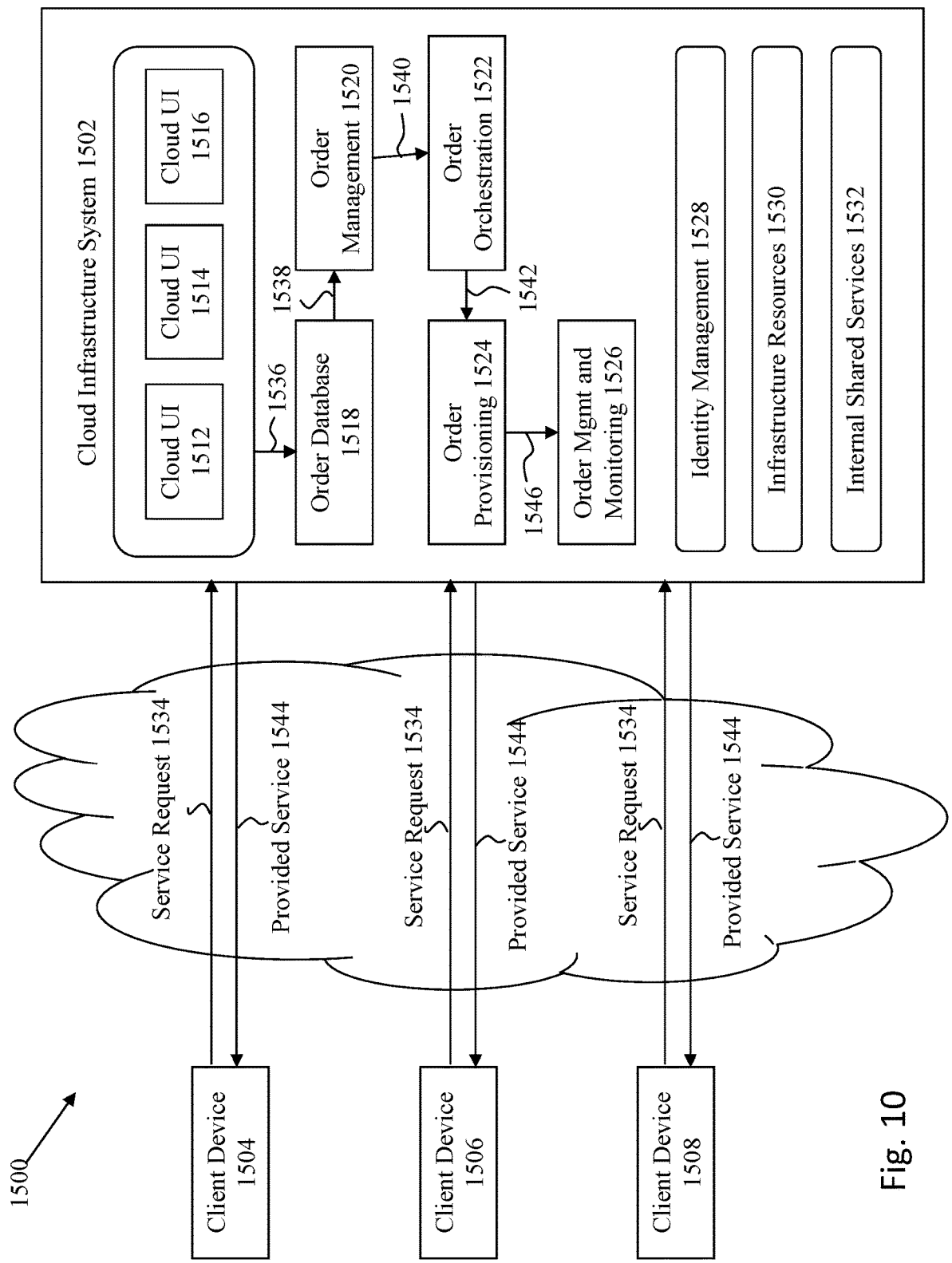
FIG. 10 is a block diagram of one or more components of a system environment in which services may be offered as cloud services, in accordance with an embodiment of the present invention.

FIG. 10 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 9. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
   maintaining a client-side statement cache associated with a database connection from a client to a database system, the client-side statement cache comprising a cursor identifier corresponding to a SQL statement;
   maintaining a cursor identifier map in the database system that is associated with the database connection, wherein the cursor identifier map correlates the cursor identifier to the SQL statement;
   de-allocating the database connection from the client without clearing the client-side statement cache; and
   re-establishing the database connection for the client, wherein the client-side statement cache is used in conjunction with the cursor identifier map at the database system to reference a cursor in a session at the database system.

2. The method of claim 1, further comprising:
   receiving an instruction at the client to execute the SQL statement after the database connection is re-established from the client to the database system;
   checking the client-side statement cache to identify the cursor identifier corresponding to the SQL statement;
   sending the cursor identifier to the database system;
   checking the cursor identifier against the cursor identifier map at the database system to identify text for the SQL statement; and
   identifying the cursor by mapping the text for the SQL statement to similar SQL text in the cursor.

3. The method of claim 1, wherein the cursor identifier map links an entry for the SQL statement in the cursor identifier map to the cursor in the session.

4. The method of claim 1, wherein upon a de-allocation of the database connection from the client, the link is broken between the entry for the SQL statement in the cursor identifier map and the cursor in the session.

5. The method of claim 1, wherein if the cursor does not yet exist in the session, then the session performs processing to create the cursor.

6. The method of claim 4, wherein the processing corresponds to a soft parse if another session had already performed a hard parse for the SQL statement.

7. The method of claim 1, wherein cursor identifier map is maintained at a database server or a database proxy in the database system.

8. A computer program product embodied on a non-transitory computer usable medium having stored thereon a sequence of instructions which, when executed by a processor, causes the processor to execute actions, the actions comprising:
   maintaining a client-side statement cache associated with a database connection from a client to a database system, the client-side statement cache comprising a cursor identifier corresponding to a SQL statement;
   maintaining a cursor identifier map in the database system that is associated with the database connection, wherein the cursor identifier map correlates the cursor identifier to the SQL statement;
   de-allocating the database connection from the client without clearing the client-side statement cache; and
   re-establishing the database connection for the client, wherein the client-side statement cache is used in conjunction with the cursor identifier map at the database system to reference a cursor in a session at the database system.

9. The computer program product of claim 8, wherein the non-transitory computer useable medium further includes the sequence of instructions which, when executed by the processor, causes the processor to execute the actions, the actions further comprising:
   receiving an instruction at the client to execute the SQL statement after the database connection is re-established from the client to the database system;
   checking the client-side statement cache to identify the cursor identifier corresponding to the SQL statement;
   sending the cursor identifier to the database system;
   checking the cursor identifier against the cursor identifier map at the database system to identify text for the SQL statement; and
   identifying the cursor by mapping the text for the SQL statement to similar SQL text in the cursor.

10. The computer program product of claim 8, wherein the cursor identifier map links an entry for the SQL statement in the cursor identifier map to the cursor in the session.

11. The computer program product of claim 8, wherein upon a de-allocation of the database connection from the client, the link is broken between the entry for the SQL statement in the cursor identifier map and the cursor in the session.

12. The computer program product of claim 8, wherein if the cursor does not yet exist in the session, then the session performs processing to create the cursor.

13. The computer program product of claim 12, wherein the processing corresponds to a soft parse if another session had already performed a hard parse for the SQL statement.

14. The computer program product of claim 8, wherein cursor identifier map is maintained at a database server or a database proxy in the database system.

15. A computer-based system, comprising:
   a computer processor to execute a set of program code instructions;
   a memory to hold the program code instructions, in which the program code instructions comprises program code which, when executed by the computer processor, causes the computer processor to execute a set of acts, the set of acts comprising:
- maintaining a client-side statement cache associated with a database connection from a client to a database system, the client-side statement cache comprising a cursor identifier corresponding to a SQL statement;
- maintaining a cursor identifier map in the database system that is associated with the database connection, wherein the cursor identifier map correlates the cursor identifier to the SQL statement;
- de-allocating the database connection from the client without clearing the client-side statement cache; and
- re-establishing the database connection for the client, wherein the client-side statement cache is used in conjunction with the cursor identifier map at the database system to reference a cursor in a session at the database system.

16. The computer-based system of claim 15, wherein the memory further includes instructions which, when executed by the computer processor, causes the computer processor to execute the set of acts, the set of acts further comprising:
- receiving an instruction at the client to execute the SQL statement after the database connection is re-established from the client to the database system;
- checking the client-side statement cache to identify the cursor identifier corresponding to the SQL statement;
- sending the cursor identifier to the database system;
- checking the cursor identifier against the cursor identifier map at the database system to identify text for the SQL statement; and
- identifying the cursor by mapping the text for the SQL statement to similar SQL text in the cursor.

17. The computer-based system of claim 15, wherein the cursor identifier map links an entry for the SQL statement in the cursor identifier map to the cursor in the session.

18. The computer-based system of claim 15, wherein upon a de-allocation of the database connection from the client, the link is broken between the entry for the SQL statement in the cursor identifier map and the cursor in the session.

19. The computer-based system of claim 15, wherein if the cursor does not yet exist in the session, then the session performs processing to create the cursor.

20. The computer-based system of claim 19, wherein the processing corresponds to a soft parse if another session had already performed a hard parse for the SQL statement.

21. The computer-based system of claim 15, wherein cursor identifier map is maintained at a database server or a database proxy in the database system.

* * * * *

UNITED STATES PATENT AND TRADEMARK OFFICE
CERTIFICATE OF CORRECTION

| | | |
|---|---|---|
| PATENT NO. | : 12,197,443 B2 | Page 1 of 1 |
| APPLICATION NO. | : 18/128914 | |
| DATED | : January 14, 2025 | |
| INVENTOR(S) | : Sahu et al. | |

It is certified that error appears in the above-identified patent and that said Letters Patent is hereby corrected as shown below:

In the Specification

In Column 4, Line 22, delete ""hard parse"" and insert -- "hard parse". --, therefor.

Signed and Sealed this
Eighth Day of April, 2025

Coke Morgan Stewart
*Acting Director of the United States Patent and Trademark Office*